US 012361483B2

(12) United States Patent
Ruble

(10) Patent No.: US 12,361,483 B2
(45) Date of Patent: Jul. 15, 2025

(54) COLLABORATIVE SECURE LOAN DATASET PLATFORM

(71) Applicant: Pentech, LLC, Dallas, TX (US)

(72) Inventor: Tod A. Ruble, Dallas, TX (US)

(73) Assignee: Pentech, LLC, Dallas, TX (US)

( * ) Notice: Subject to any disclaimer, the term of this patent is extended or adjusted under 35 U.S.C. 154(b) by 0 days.

(21) Appl. No.: 18/140,564

(22) Filed: Apr. 27, 2023

(65) Prior Publication Data

US 2023/0351496 A1 Nov. 2, 2023

Related U.S. Application Data

(60) Provisional application No. 63/335,572, filed on Apr. 27, 2022.

(51) Int. Cl.
*G06Q 40/03* (2023.01)
*G06Q 10/1057* (2023.01)

(52) U.S. Cl.
CPC ......... *G06Q 40/03* (2023.01); *G06Q 10/1057* (2013.01)

(58) Field of Classification Search
CPC ............................ G06Q 40/03; G06Q 10/1057
USPC .................................................... 705/35–45
See application file for complete search history.

(56) References Cited

U.S. PATENT DOCUMENTS

| 8,626,649 B1* | 1/2014 | Bent ............. | G06Q 40/06 705/36 R |
| 10,692,147 B1* | 6/2020 | Ruble ............. | G06Q 40/03 |
| 10,803,514 B1* | 10/2020 | Campbell, III ....... | G06Q 40/00 |
| 2006/0059086 A1* | 3/2006 | Mulhern ............. | G06Q 10/00 705/38 |
| 2012/0030082 A1* | 2/2012 | Voltz ............. | G06Q 40/02 705/35 |
| 2013/0275279 A1* | 10/2013 | Raymond ........... | G06Q 40/125 705/30 |
| 2023/0222575 A1* | 7/2023 | Zhu ............. | G06Q 40/03 705/38 |
| 2023/0351496 A1* | 11/2023 | Ruble ............. | G06Q 40/03 |
| 2024/0161187 A1* | 5/2024 | Peak ............. | G06Q 40/03 |

* cited by examiner

*Primary Examiner* — Robert R Niquette
(74) *Attorney, Agent, or Firm* — Foley & Lardner LLP

(57) ABSTRACT

Embodiments herein recite a method including displaying, by a server, an input element on a graphical user interface configured to instruct the server to generate a secure loan dataset having a triggering employment status attribute that causes the server to execute a transaction associated with the secure loan dataset; receiving, by the server, a negative selection associated with the input element; executing, by the server, a computer model using at least one attribute of a user to simulate one or more scenarios in which the triggering employment status is modified; and dynamically revising, by the server, the graphical user interface to display data associated with at least one scenario simulating at least one modification of the triggering employment status.

20 Claims, 13 Drawing Sheets

COLLABORATIVE SECURE LOAN DATASET PLATFORM

CROSS-REFERENCE TO RELATED APPLICATIONS

The present application claims priority to U.S. Provisional Application No. 63/335,572, filed on Apr. 27, 2022, which is incorporated herein by reference in its entirety for all purposes.

TECHNICAL FIELD

The present application relates to data communication and, more particularly, to systems and methods for a collaborative software solution and computer modeling techniques.

BACKGROUND

Many employers offer their employees retirement plans, profit sharing, and/or money purchase plans. Many of these plans allow plan participants to borrow against the money they have built up in their account, referred to herein as "retirement loans." The loan feature is a popular employee benefit providing a convenient source of emerging liquidity to plan participants, particularly to lower-wage earners.

As convenient and popular as retirement plans loan may be, they can nevertheless lead to unexpected liabilities that can be devastating to the plan participant if they are not repaid in a timely manner. Because loans that have not been repaid are subject to treatment as a distribution from the plan in the event of a job separation, they subject the plan participant and/or their estate to a tax liability of a significant amount of any such distribution. As used herein, a "job separation" is a loss of employment due to uninsured death, disability, or as a result of an employee's involuntary actions (e.g., layoff not caused by any fault of the employee). In other examples, job separation may also include any termination of employment due to reason others than separation for cause (e.g., being fired) or early retirement. Loans repaid within the repayment period, under present rules, avoid such treatment.

Employers sometimes retain employees' retirement assets in a central trust. Consequently, any loans originating from the central trust (e.g., retirement loans) may be treated as an investment or an asset of the plan's central trust. A retirement loan must be treated as a third-party commercial loan originating from the central trust. Therefore, employers have a fiduciary duty to preserve and maintain the assets (e.g., accrued benefits) within the central trust in the event of a loan default. For instance, when a retirement loan is initiated, the employer must ensure that the loan is repaid and the assets are returned to the central trust. Therefore, it is vital that the employer is able to monitor the repayment of the retirement loans and, in the case of default, recoup the retirement loan.

As the processing power of computers allow for greater functionality and internet technology allows for increasing interconnectivity between computing systems, many involved parties (e.g., employers, employees, recordkeepers, and the financial institutions) utilize computer-implemented resources to manage the accounts, provide account information, and monitor the progress of accounts or the repayment of loans. Non-computer management methods have been rendered obsolete because the use of computer-implemented methods provides fast, accurate, and efficient results that are in-line with consumer expectations.

However, since the implementation of the above-mentioned sophisticated online tools, several shortcomings in these technologies have been identified and have created a new set of impediments. For instance, most recordkeeping computing systems do not have capabilities to maintain the datasets as data-format-agnostic, uniform, and transferrable. As a result, most recordkeeping computer systems are not able to effectively communicate with other computing systems involved in the loan repayment process. Furthermore, the retirement accounts or loan datasets are not portable and may not be transferred to another computing system when needed, because each recordkeeping computer system and financial institution computer system use a different computing ecosystem to create the loan datasets.

These technical shortcomings have resulted in inefficient and time-consuming identification of loan defaults and have hindered employers' efforts to recoup unpaid loans. Conventional systems use manual verification systems and methods that are tedious, time consuming methods that usually result in delayed and/or inaccurate results. For instance, when a user initiates a loan and loses their employment, conventional methods rely on human reviewers to determine whether the user has indeed lost their employment and/or found a new job.

Furthermore, electronic platforms offering secure loans do not provide a platform that displays user-friendly, real-time data informing participants of potential losses from having unsecured loans. For instance, users are typically not presented with accurate scenarios in which they could default and which could result in financial burden/fees.

SUMMARY

For the aforementioned reasons, there is a need for a more efficient system and method for managing data corresponding to retirement plans, which would reduce the administrative burden and allow employers, employees, recordkeepers, and investment providers to seamlessly transfer loan data records, identify defaults, and recoup plan assets in the event of defaults. There is a need for a computer-specific set of rules to provide a server in communication with multiple recordkeepers, insurance company servers, financial institution servers, employee computing devices, and employer servers capable of ingesting incompatible data (i.e., despite the involved parties utilizing different computer systems, file types, and digital infrastructures) and generating data-format-agnostic datasets. Furthermore, there is a need to provide an efficient and accurate collaborative platform able to process a high number of loan datasets and multiple modifications from different involved parties. There is also a need to efficiently and accurately ensure compliance with the fiduciary duties imposed upon the plan sponsor of monitoring and recouping trust assets in the event of a default.

Moreover, there is a need for a server to host or otherwise functionally control an electronic platform where participants can view relevant data in real time or near real time, such as simulated scenarios, loss predictions, and the like.

Methods and systems described herein allow a server to communicate with multiple computing environments (e.g., recordkeeper, employer, financial institution, and insurance company servers) to create a uniform and data-format-agnostic file that could be transferred to all of the above-mentioned computing environments. Methods and systems disclosed herein may then monitor and dynamically adjust those files, as well as generate transactions based on those files. For instance, when the user's employment status changes, the server can cause the remaining balance from the loan to be transferred to the employer. The described server can host or control an electronic platform where participants are presented with relevant data. The server can also establish electronic communication sessions between participants and suitable customer representatives and agents.

In an embodiment, a method comprises upon receiving an input from a computing device submitting a request for a transaction and indicating an employment triggering status, web-crawling, by a server, a plurality of online resources to identify a message containing at least one keyword related to the employment triggering status configured to cause the server to execute a second transaction associated with a secure loan dataset of the computing device; appending, by the server, the message to the request; and generating, by the server, a stop signal for the transaction associated with the secure loan dataset when the message conflicts with the input.

In an embodiment, a system comprises a non-transitory machine-readable memory configured to store a set of instructions that when executed, cause a processor to: upon receiving an input from a computing device submitting a request for a transaction and indicating an employment triggering status, web-crawl a plurality of online resources to identify a message containing at least one keyword related to the employment triggering status configured to cause the processor to execute a second transaction associated with a secure loan dataset of the computing device; append the message to the request; and generate a stop signal for the transaction associated with the secure loan dataset when the message conflicts with the input.

In another embodiment, a method comprises displaying, by a server, an input element on a graphical user interface configured to instruct the server to generate a secure loan dataset having a triggering employment status attribute that causes the server to execute a transaction associated with the secure loan dataset; receiving, by the server, a negative selection associated with the input element; executing, by the server, a computer model using at least one attribute of a user to simulate one or more scenarios in which the triggering employment status is modified; an dynamically revising, by the server, the graphical user interface to display data associated with at least one scenario simulating at least one modification of the triggering employment status.

In another embodiment, a system comprises a non-transitory machine-readable memory configured to store a set of instructions that when executed, cause a processor to: display an input element on a graphical user interface configured to instruct the processor to generate a secure loan dataset having a triggering employment status attribute that causes the processor to execute a transaction associated with the secure loan dataset; receive a negative selection associated with the input element; execute a computer model using at least one attribute of a user to simulate one or more scenarios in which the triggering employment status is modified; and dynamically revise the graphical user interface to display data associated with at least one scenario simulating at least one modification of the triggering employment status.

In another embodiment, a method comprises receiving, by a server from a user computing device, a request to create a secure loan dataset; retrieving, by the server from an employer server and a recordkeeping server, one or more data records associated with a user profile and a secure loan dataset associated with a first user, the one or more data records comprising at least a triggering employment status attribute that causes the server to execute a financial transaction associated with the secure loan dataset; mapping, by the server, one or more data records associated with the user profile and the secure loan to one or more corresponding data records within the secure loan dataset; monitoring, by the server, data associated with a modification to the triggering employment status attribute of a plurality of users of an enterprise; training, by the server, a predictive model using the data associated with the plurality of users; executing, by the server, the predictive model using data associated with a second user to predict data associated with the triggering employment status attribute; and generating, by the server, a notification that includes a likelihood of the triggering employment status attribute for the second user.

In another embodiment, a system comprises a non-transitory machine-readable memory configured to store a set of instructions that when executed, cause a processor to: receive, from a user computing device, a request to create a secure loan dataset; retrieve, from an employer server and a recordkeeping server, one or more data records associated with a user profile and a secure loan dataset associated with a first user, the one or more data records comprising at least a triggering employment status attribute that causes the processor to execute a financial transaction associated with the secure loan dataset; map one or more data records associated with the user profile and the secure loan to one or more corresponding data records within the secure loan dataset; monitor data associated with a modification to the triggering employment status attribute of a plurality of users of an enterprise; train a predictive model using the data associated with the plurality of users; execute the predictive model using data associated with a second user to predict data associated with the triggering employment status attribute; and generate a notification that includes a likelihood of the triggering employment status attribute for the second user.

In another embodiment a system comprises a predictive model, a server in communication with the predictive model, the server configured to: receive, from a user computing device, a request to create a secure loan dataset; retrieve, from an employer server and a recordkeeping server, one or more data records associated with a user profile and a secure loan dataset associated with a first user, the one or more data records comprising at least a triggering employment status attribute that causes the server to execute a financial transaction associated with the secure loan dataset; map one or more data records associated with the user profile and the secure loan to one or more corresponding data records within the secure loan dataset; monitor data associated with a modification to the triggering employment status attribute of a plurality of users of an enterprise; train the predictive model using the data associated with the plurality of users; execute the predictive model using data associated with a second user to predict data associated with the triggering employment status attribute; and generate a notification that includes a likelihood of the triggering employment status attribute for the second user.

In another embodiment, a method comprises in response to receiving an indication of a first electronic communication session with a user computing device, retrieving, by a server, an identifier of a user operating the user computing device; retrieving, by the server, a secure loan dataset for the user, the secure loan dataset comprising at least a triggering employment status attribute that causes execution of a transaction associated with the secure loan dataset; executing, by the server using at least one of the attribute or data associated with the secure loan dataset, a computer model to determine a digital product attribute for the user; and routing, by the server, the first electronic communication session to an agent thereby establishing a second electronic communication session between the user computing device and an agent computing device operated by the agent.

In another embodiment, a system comprises a non-transitory machine-readable memory configured to store a set of instructions that when executed, cause a processor to: in response to receiving an indication of a first electronic communication session with a user computing device, retrieve an identifier of a user operating the user computing device; retrieve a secure loan dataset for the user, the secure loan dataset comprising at least a triggering employment status attribute that causes execution of a transaction associated with the secure loan dataset; execute, using at least one of the attribute or data associated with the secure loan dataset, a computer model to determine a digital product attribute for the user; and route the first electronic communication session to an agent thereby establishing a second electronic communication session between the user computing device and an agent computing device operated by the agent.

In another embodiment, a system comprises an agent computing device operated by an agent; and a server in communication with the agent computing device, the server configured to: in response to receiving an indication of a first electronic communication session with a user computing device, retrieve an identifier of a user operating the user computing device; retrieve a secure loan dataset for the user, the secure loan dataset comprising at least a triggering employment status attribute that causes execution of a transaction associated with the secure loan dataset; execute, using at least one of the attribute or data associated with the secure loan dataset, a computer model to determine a digital product attribute for the user; and route the first electronic communication session to an agent thereby establishing a second electronic communication session between the user computing device and an agent computing device operated by the agent.

It is to be understood that both the foregoing general description and the following detailed description are exemplary and explanatory and are intended to provide further explanation of the invention as claimed.

BRIEF DESCRIPTION OF THE DRAWINGS

Certain aspects of the present invention are depicted in the accompanying drawings, which are intended to be considered in conjunction with the detailed description below, and which are intended to be illustrative rather than limiting, and in which.

DETAILED DESCRIPTION

While various aspects and embodiments have been disclosed, other aspects and embodiments are contemplated. The various aspects and embodiments disclosed are for purposes of illustration and are not intended to be limiting, with the true scope and spirit being indicated by the following claims.

Even though certain embodiments within the present disclosure have been described within the context of retirement, the present disclosure applies to all investments, including 403(b) and IRA plans, among others.

Figure 1:
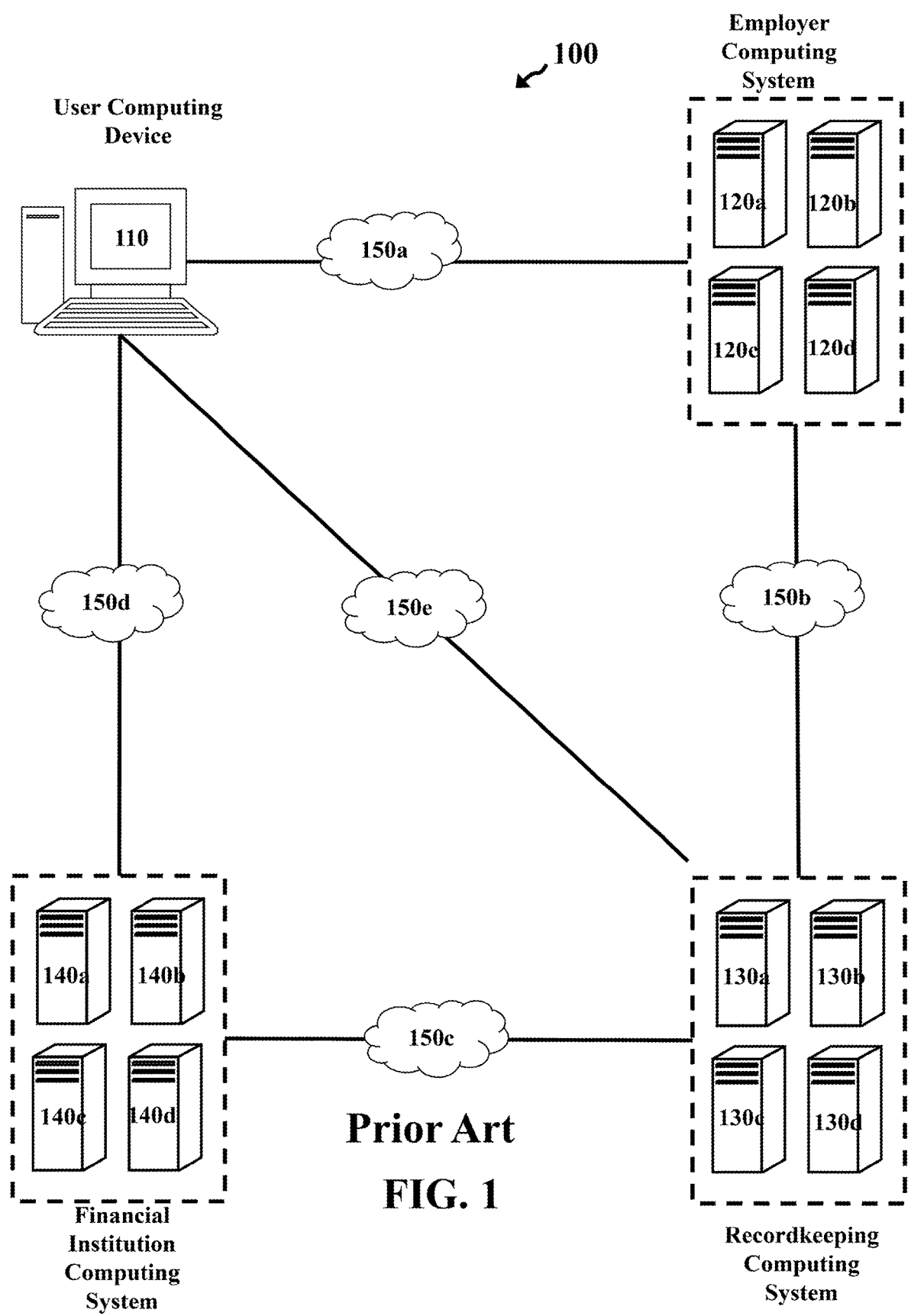
FIG. 1 illustrates an example of a conventional computer system for processing loan datasets, according to an embodiment.

FIG. 1, illustrates a conventional computer system for processing loan datasets, where the system 100 represents conventional electronic communication between different computing infrastructures involved in repayment of a retirement loan. The system 100 comprises a user computing device 110, employer server 120a-d (collectively employer computing system 120), recordkeeping servers 130a-d (collectively 130), financial institution servers 140a-d (collectively financial institution computing system 140), and networks 150a-e (collectively networks 150). In some embodiments, the user computing device may initiate the loan directly from the recordkeeping server 130.

In operation, an employee may utilize the user computing device 110 to connect with an employer computing system 120 via the network 150a in order to initiate a retirement loan. The employer computing system 120 may include multiple servers 120a-d associated with the employer. Each employer server within the employer computing system 120 may communicate with one or more recordkeeping servers within the recordkeeping computing system 130 (via network 150b) in order to update the employee's retirement plan.

The recordkeeping computing system 130 represents one or more parties responsible for managing the day-to-day operations of the employee's retirement account. The recordkeeping computing system 130 may monitor the employee's retirement account for employer contributions, employee contribution, and/or various investments associated with the retirement dataset. The recordkeeping computing system 130 may also monitor the assets of each employee and their respective investments within a retirement pool (e.g., a central trust including all the retirement assets associated with different employees). The recordkeeping computing system 130 may also be responsible for tracking employees' contribution rates and investment selections, providing account statements and daily valuations, and maintaining records of the retirement accounts. For example, the recordkeeping computing system account may be responsible to select an investment provider. An investment provider may be any entity that provides investment opportunities for the employees and their retirement plans. A non-limiting example of an investment provider is an investment fund (e.g., mutual funds, exchange-traded funds, money market funds, and collective trusts), which is a supply of capital belonging to numerous investors used to collectively purchase securities while each employee retains ownership his own shares and reserves the rights to his share of assets within the central trust. In some embodiments, the financial institution computing system 140 may also fulfil the role of an investment provider.

Once the loan has been originated by the employer computing system 120 and recordkeeping computer system 130, the employer computing system 120 and/or the recordkeeping computing system 130 may cause the financial institution computing system 140, which holds the assets (e.g., assets of each retirement plan) of the central trust, to disburse a pre-determined amount of monetary funds to the employee (e.g., an account associated with the employee). In some configurations, the loan is originated by the employer computing system 120 or the recordkeeping computing system 130 from a trust comprising multiple employees' retirement plans. For instance, the employer computing system 120 may create a central trust that contains assets corresponding to each employee's retirement account. As described above, the employer also has a fiduciary duty to safeguard the assets in the above-mentioned central trust. For example, the employer may be required to protect the central trust from decrease in value due to bad investments, unrepaid employees loans, and the like.

When originating the loan, the recordkeeping computing system 130 may proportionally (e.g., pro rata) liquidate an employee's retirement account. For example, an employee's account consists of 25% stocks, 50% target funds, and 25% fund of funds. When the employee requests a loan equivalent to 20% of his retirement account value, the recordkeeping computing system 130 may pro rata liquidate the retirement account and generate the loan based on an appropriate portion of the above-mentioned investments.

Figure 2:
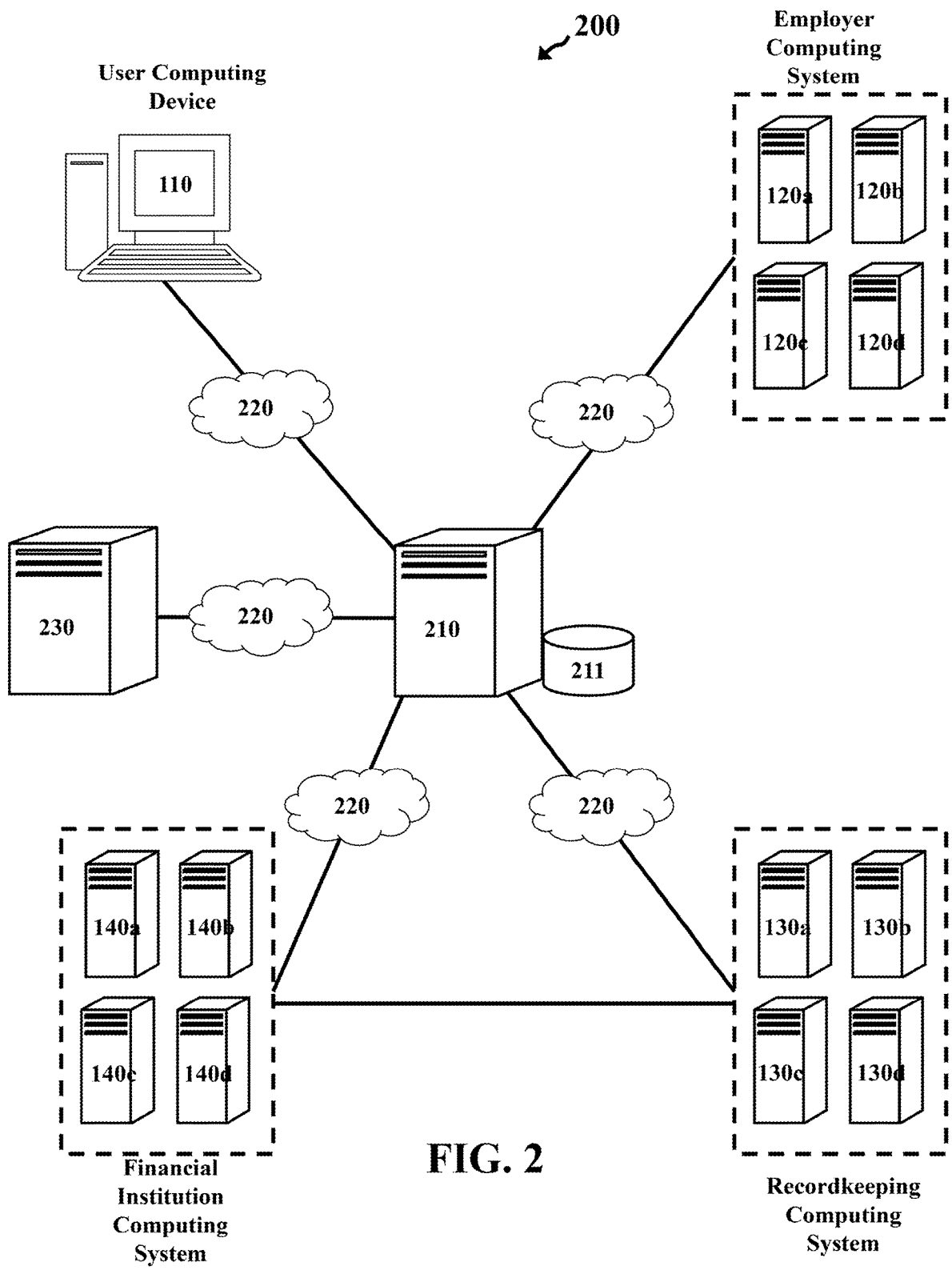
FIG. 2 illustrates a computer system for processing loan datasets, according to an embodiment.

In some configurations and as illustrated in FIG. 2, the financial institution computing system 140 may be part of the same entity as the recordkeeping computing system 130. For example, a division of an entity may proportionally liquidate an employee's assets (e.g., the employee's interest in the central trust) and another division of the same entity may be responsible for retaining assets within the central trust, including the employee's loan and/or the employees remaining retirement account balance, if any. Simply put, the financial institution computing system 140 may be financial branch of the recordkeeping computer system or entity.

In some embodiments, employees may repay their loans through payroll deductions. In this way, the employer (or the employer's payroll provider) deducts the loan payments from the employees pay each pay cycle and remits the funds to the financial institution while sending a record of the payroll to the recordkeeper. Often the record is first sent to the recordkeeper who then instructs the financial institution to request the funding from the employer.

The user may then repay the loan via the financial institution computing system 140, which will in turn update the recordkeeping computing system 130 via network 150*c* and the employer computing system 120 via the network 150*f*. Furthermore, the recordkeeping computing system 130 may also provide detailed description of the employees' retirement account and the loan account to the employee via the network 150*e*.

As described above, generation of a retirement loan involves multiple computing systems communicating confidential and sensitive information utilizing several different networks. Each computing system may utilize a different computing ecosystem and generate various files and loan datasets using different formats that are inconsistent with the other computing devices described within FIG. 1. For example, the recordkeeping computing system 130 may use a computer ecosystem I and may generate recordkeeping files in a first format, the employer computing system 120 may use computer ecosystem II and generate employer attribute profile in a second format, and the financial institution computing system 140 may use a homegrown computer ecosystem and generate files in a third format. The above-mentioned file formats may not be compatible or easily transferrable between different computing systems described in FIG. 1. As a result, different computing systems described in FIG. 1 must use considerable computing resources to translate data received from different computing systems, which has proven to be inefficient and costly.

Furthermore, each computing system may require the other computing systems to utilize a secure communication protocol. For example, the recordkeeping computing system 130 may require the financial institution computing system 140 to communicate via the network 150*c* (e.g., a secure cloud created by the recordkeeping computing system 130). This communication restriction may be undesirable for the financial institution computing system 140. As illustrated in FIG. 1, conventional systems typically require five different communication networks and protocols, which is inefficient and costly.

A new computer system described herein adds new functionality to conventional systems by utilizing a new server configured to receive multiple data structures in different formats from multiple servers and generate a uniform data structure in a common format. FIG. 2 illustrates operational steps of a method for providing a collaborative data-format-agnostic computing system for processing loan datasets, according to an embodiment. A system 200 comprises an analytics server 210, a database 211, the employer computing system 120, the recordkeeping computing system 130, the financial institution computing system 140, the insurance server 230, and user computing device 110. The above-mentioned computing devices and systems may communicate with each other and with the analytics server 210 via the communication network 220, such as the Internet, or a secure communication protocol (e.g., private or public network).

In operation, each computing device described in FIG. 2 may only communicate with the analytics server 210 and the analytics server 210 may generate a data-format-agnostic, portable, and secure loan dataset that could be transferred to any or all the computing systems described in FIG. 2. In an instance, an employee operating the user computing device 110, may communicate with the analytics server 210 and request a retirement loan, transfer the portable retirement dataset to a desired central trust, and/or derive various forms of analytical information from the data records of the employer computing system 120, the recordkeeping computing system 130, and/or financial institution computing system 140.

The employer computing system 120 may store data records that are associated with interactions between employees and the employer or the recordkeeping computing system 130, where the data records each contain at least one field identifying all pertinent information regarding each employee (e.g., employee attributes, such as salary and demographic data), retirement attributes (e.g., employee and employer contribution), investment plan/account, and/or recordkeeper attributes (including information regarding the investment providers). The employer computing system 120 may also monitor and store information associated with the employee's investment plan/account, such as the type of the investment plan, terms/conditions associated with the investment, the recordkeeper, and/or the investment provider. The employer computing system 120 may be hosted on any number of devices comprising a non-transitory, machine-readable storage medium capable of storing data records received from the analytics server 210, and, in some cases, the recordkeeping computing system 130 or the user computing device 110. The employer computing system 120 may further comprise a processor capable of executing various queries and data record management processes, in accordance with various instructions from the analytics server 210. The employer computing system 120 may be hosted on a distinct device that is in networked-communication with the analytics server 210.

The analytics server 210 may perform various data analysis on data records stored on the employer computing system 120, received from the recordkeeping computing system 130, user computing device 110, and/or the financial institution computing system 140. The analytics server 210 may transmit the results of the analyses to any of the above-mentioned devices/parties within the system 200. The analytics server 210 may also generate multiple graphical user interfaces configured to receive data from the user computing device 110, generate/modify a portable retirement dataset, and display the portable retirement dataset in a collaborative platform to one or more parties (e.g., the user computing device 110 and/or the recordkeeping computing system 130). The analytics server 210 may be any device comprising a processor capable of performing the various tasks and processes described herein. A non-limiting examples of the analytics server 210 may include a server, desktop, laptop, tablet, and the like. The analytics server 210 comprises any number of computer-networking components, which facilitate inter-device communications via the communication network 220. In some configurations, there may be any number of distinct devices functioning as the analytics server 210 in a distributed computing environment.

In operation, an employee operating the user computing device 110 may access a web-based service or application hosted by the analytics server 210, from which the employee may provide various types of data relevant to the employee's retirement plan/account, the employee's employer, and/or modify details of the retirement plan/loan. The user computing device 110 may be any device comprising a processor capable of performing the various tasks and processes described herein. A non-limiting examples of the user computing device 110 may include a server, desktop, laptop, tablet, and the like.

Recordkeeper computing system 130 may be any computing device comprising a processor capable of performing the various tasks and processes described herein. A non-limiting example of the recordkeeping computing system 130 may include a server, desktop, laptop, tablet, and the like. The recordkeeping computing system 130 may comprise any number of computer-networking components (e.g., network interface card) that facilitate inter-device communications via the communication network 220. In operation, recordkeeping computing system 130 may represent one or more servers associated with different recordkeepers. The recordkeeping computing system 130 represents one or more parties responsible for managing the day-to-day operations of the employee's retirement accounts or loans. The recordkeeping computing system 130 may monitor the employee's retirement account including employer contributions, employee contribution, and/or various investments associated with the retirement dataset. The recordkeeping computing system 130 may monitor the assets of each employee and their respective investments within a retirement pool (e.g., a central trust including all the retirement assets associated with different employees managed by the financial institution computing system 140). The recordkeeping computing system 130 may also be responsible for tracking employees' contribution rates and investment selections, providing account statements and daily valuations, and maintaining records of the retirement accounts.

In operation, the recordkeeping computing system 130 and the investment providers may directly communicate. In some embodiments, the recordkeeping computing system 130 are associated with all or a part of the same institution as the investment provider. For example, an investment provider may also provide recordkeeping services. The recordkeeping computing system 130 may transmit pertinent investment information (e.g., retirement plans) to the investment providers. The investment provider may then invest the assets associated with the employee (kept at the financial institution computing system 140) and transmit the received information and investment data associated with the investment account to the recordkeeping computing system 130.

The system 200 may also include financial institution computing system 140, which represents the computing system of the financial institution in charge of the central retirement trust. As described above, many employers may generate a central trust and invest all retirement assets of their employees into the central trust. In some configurations, the financial institution computing system 140 may represent a bank, a custodian, or any other financial entity that holds the assets within the central trust or the plan participant's retirement loan. The system 200 may also include a database 211, which is configured to store information regarding the recordkeepers, investment providers, employees, or other pertinent account information. The database 211 may also store all portable and data-format-agnostic retirement datasets or loan datasets generated by the analytics server 210. The system 200 may also include an insurance server 230, which may represent an underwriting entity providing actuarial data to the analytics server 210.

By implementing the system 200, a server, such as the analytics server 210, may create new functionalities. For instance, the analytics server 210 may be actively tethered to the above-described computing elements and may create a new method of generating secure and portable retirement loan datasets by monitoring and aggregating data and creating compatibilities among disparate computing systems.

Figure 3:
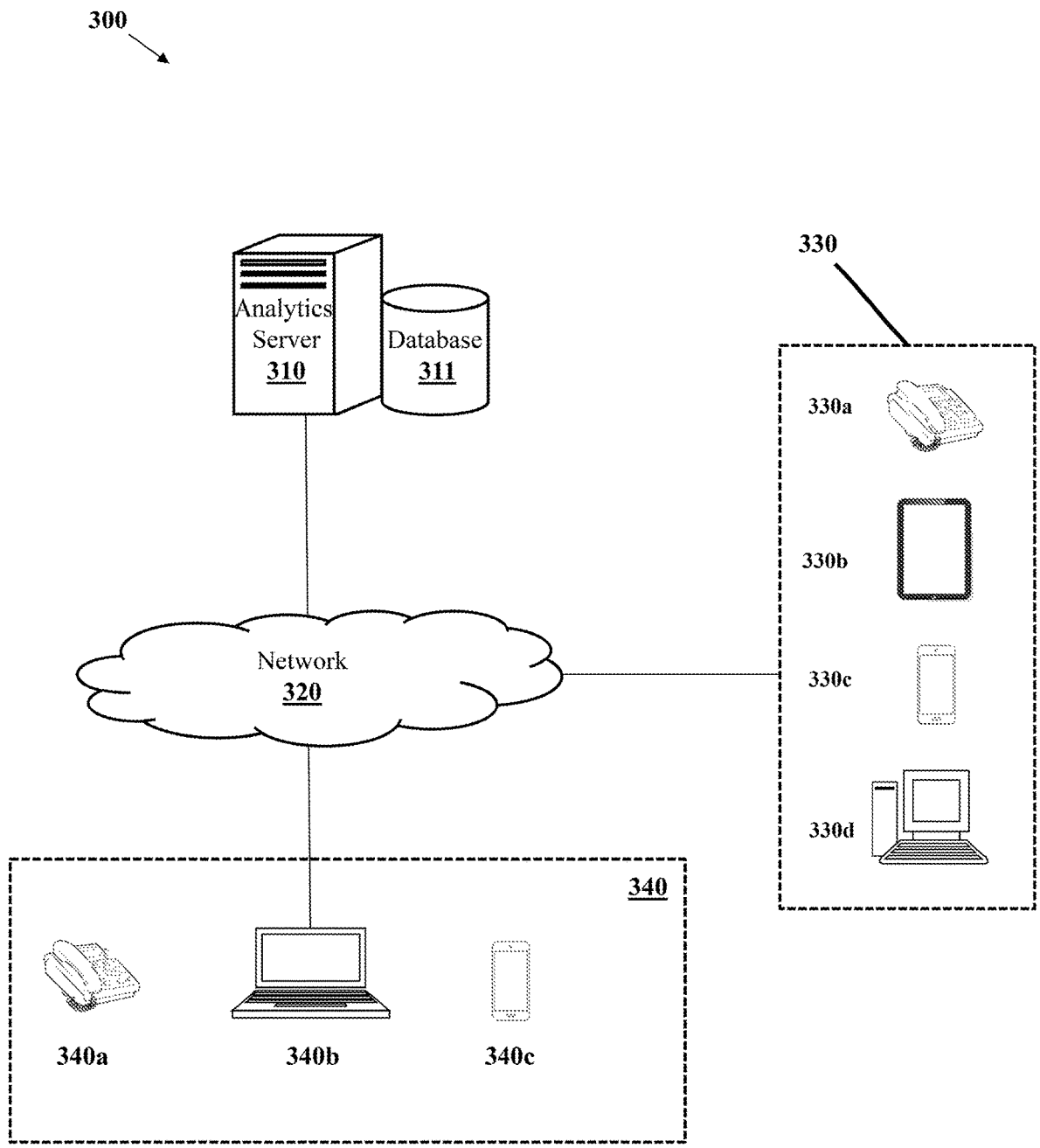
FIG. 3 illustrates a computer system for processing loan datasets and establishing electronic communication sessions with participants, according to an embodiment.

FIG. 3, illustrates various components of an intelligent routing system 300. An institution may employ the intelligent routing system 300 to optimize data and call routing to remote electronic devices. The intelligent routing system 300 may include an analytics server 310 and a database 311 that are similar to the analytics server 210 and the database 211. For brevity, these features are not described again. In addition to the above-described functionalities, the analytics server 310 may also route electronic communication sessions from customers (e.g., participants) to employees within an organization. The intelligent routing system 300 may include a first electronic device 330a operated by a first employee, second electronic device 340b operated by a second employee, a third electronic device 330c operated by a third employee, and a fourth electronic device 330d operated by a fourth employee (collectively electronic devices 330). The employees operating the electronic devices 330 may be employees of a call center where each employee is connected to a customer (via the methods and systems discussed herein). These employees are also referred to herein as customer representatives or agents.

The intelligent routing system 300 may also include user devices 340a-c (collectively user devices 330). These user devices may represent any electronic device configured to establish an electronic communication session with another electronic device, such as the electronic devices 330. These user devices 340 may be operated by participants. Non-limiting examples of electronic devices 340 may include a landline telephone 330a, a desktop 330b, and a smart phone 330c, and the like. The analytics server 310 may use Internet and VoIP, public switched telephone network (PSTN), and/or cellular networks to establish electronic communication sessions between each of the electronic devices.

The analytics server 310 may receive electronic communication sessions (e.g., calls or chat sessions initiated on a website) from the user devices 340 and route the electronic communication sessions to one (or more) electronic devices 330. The intelligent routing system 300 may operate in a context of computer-executable instructions, such as program modules. A server computer, such as the analytics server 310 may execute the program modules. The program modules may include programs, objects, components, data structures, etc., that perform particular tasks described herein. The features of the intelligent routing system 300 may function either in a computing device or in a distributed computing environment, where the processing devices may perform the tasks described herein. In a distributed computing environment, program modules may be located in both local and remote computer storage media including memory storage devices.

The features depicted in the system 300 may communicate with each other over the network 320, which is similar to the network 220 (FIG. 2). For brevity, functionality performed by this network is not repeated.

The intelligent routing system 300 may operate in a computing environment where the analytics server 310 may execute various network data monitoring and management tasks. The database 311 and application programs associated with the analytics server 310 may be stored and executed on local computing resources. The analytics server 310 may locally query the database 311 to retrieve data records associated with the user devices 340. The database 311 may store a summary of the data records. The summary of the data records may be indexed according to an identifier associated with the user devices 340, such that the analytics server 310 can identify a participant operating the user devices 340. The analytics server 310 may analyze and evaluate the data records to intelligently route various electronic requests to the electronic devices 340.

The intelligent routing system 300 may operate in a cloud-computing environment. The analytics server 310 may execute a network data management software application to intelligently transmit electronic requests to the electronic devices 330. The data and application programs discussed herein may be stored and executed on a remote cloud-based analytics server 310 accessed over a network cloud. The remote cloud-based analytics server 310 may execute various protocols and methods discussed herein. The remote cloud-based analytics server 310 may monitor the data records associated with the request and/or query the database 311 to retrieve the data records associated with the request. The remote cloud-based analytics server 310 may analyze and evaluate the data records to intelligently route data accordingly.

In operation, the analytics server 310 may receive and route data packets from the user devices 340 to the electronic devices 330 via the network 320. For instance, a user operating the electronic devices 330 (e.g., remote employees) may execute an application (associated with the analytics server 310) to receive and send data packages to the analytics server 310.

Electronic devices 330 may be computing devices having a processor. The electronic devices 330 may further include a processing unit and a non-transitory machine-readable storage medium. The processing unit may include a processor with a computer-readable medium, such as a random access memory coupled to the processor. The electronic devices 330 may execute algorithms or computer executable program instructions, which may be executed by a single processor or multiple processors in a distributed configuration. The electronic devices 330 may interact with one or more software modules of a same or a different type operating within the intelligent routing system 300.

Non-limiting examples of the processor may include, but are not limited to, a microprocessor, an application specific integrated circuit, and a field programmable object array, among others. The electronic devices 330 may be capable of executing various tasks, such as data processing tasks and data analysis tasks. Non-limiting examples of the electronic devices 330 may include a desktop computer, a server computer, a laptop computer, a tablet computer, a mobile phone, a watch, and the like.

The database 311 may be capable of storing data records in a plain format and/or an encrypted version. The data records may include information associated with the company associated with the analytics server 310 and/or any computing feature within the system 300 (e.g., a number of electronic devices 330, types of electronic devices 330, data associated with the employees operating the electronic devices 330, a description and a specification of electronic devices 330, the user profile records, and the like.)

The database 311 may be in communication with a processor of the analytics server 310, the electronic devices 330. The processor is capable of executing multiple commands of the intelligent routing system 300. The database 311 may be a part of the analytics server 310. Additionally or alternatively, the database 311 may be a separate component in communication with the analytics server 310. The database 311 may have a logical construct of data files and records, which may be stored in a non-transitory machine-readable storage media, such as a hard disk or memory, controlled by software modules of a database program (e.g., SQL), and a database management system that executes the code modules (e.g., SQL scripts) for various data queries and management functions.

User devices 330 may represent any electronic device configured to establish an electronic communication session with another electronic device. Non-limiting examples of user devices 330 may include a landline telephone 330a, a tablet 330b, a smart phone 330c, a desktop 330d, and the like. The analytics server 310 may use Internet and VoIP, public switched telephone network (PSTN), and/or cellular networks to establish electronic communication sessions between each of the electronic devices.

The analytics server 310 may use three general classes of telephonic networks (e.g., PSTN, cellular networks, and Internet and VoIP network) to establish a connection between the user devices 330 and the electronic devices. For clarity and brevity, these telephonic networks are not illustrated in FIG. 3. PSTN may be characterized as a circuit-switched telephony system establishing lossless connections and high fidelity audio. In some configurations, components of the cores of the PSTN may be replaced by internet protocol (IP) connections, but private links of PSTN may remain tightly controlled to ensure near-zero packet loss. The analytics server 310 may also use cellular networks (CDMA and/or GSM protocols) to establish a telephonic electronic session among different electronic devices. Like PSTN, cellular networks have a circuit-switched core, with portions that may be replaced by IP links. While these networks can have considerably different technologies deployed in their wireless interfaces, the cores of cellular networks may be similar to PSTN. Lastly, VoIP networks may run on top of IP links and generally share paths as other Internet-based traffic. The analytics server 310 may utilize a variety of existing methodologies to establish an electric communication session using VoIP.

The analytics server 310 may also utilize a variety of technologies and methodologies to establish electronic communication sessions among different electronic devices described herein. In addition to telephonic audio connections described above, the analytics server 310 may use homegrown or other chat applications where one or more electronic devices can transmit text or other media elements to each other. The analytics server 310 may also use the Internet and VoIP network to establish a videoconference among one or more electronic devices. In some configurations, the analytics server 310 may also use a third-party application to establish an electronic communication session among the electronic devices described herein.

In operation, the analytics server 310 may receive an electronic request from user device 340c where a customer operating the user device 340c calls a call center operated by the analytics server 310. The analytics server 310 analyzes the received call to identify a suitable remote employee (operating electronic device 330a, 330b, 330c, or 330d) to receive the call and to satisfy the customer's request received via the user device 340c. Specifically, using methods and systems described below, the analytics server 310 identifies a customer request to be satisfied by one of the remote employees operating the electronic devices 340. Based on the identified request, the analytics server 310 may analyze the accounts benefited by the customer and route the customer accordingly.

Figure 4:
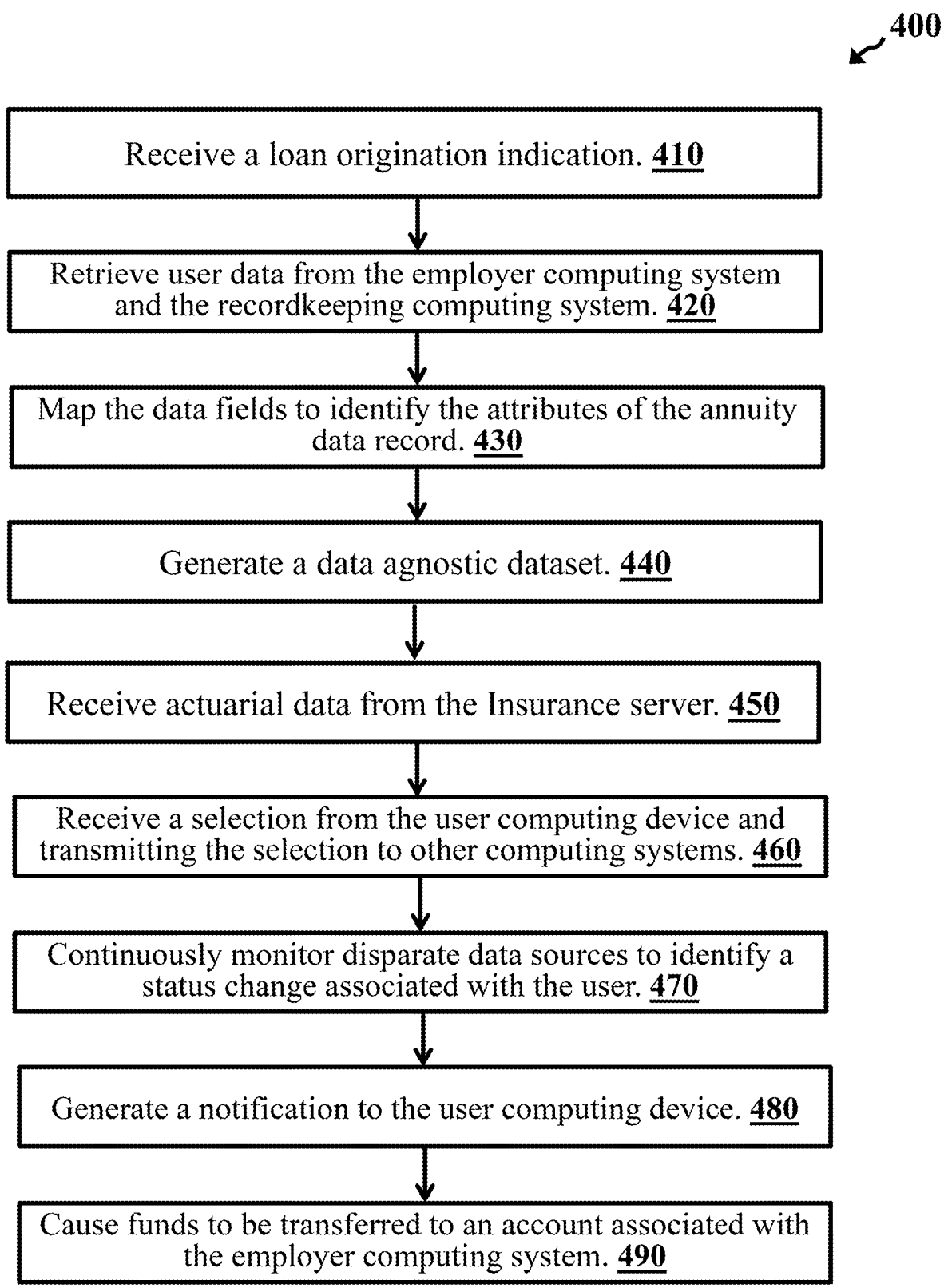
FIGS. 4-9 illustrate operational steps of a method for generation, modification, and transmittal of a portable retirement plan dataset, according to embodiments.

Referring now to FIG. 4, a flowchart depicting operational steps of a method for generation, modification, and transmittal of a portable retirement dataset is provided. Steps of the method 400 may be implemented using the analytics server, the recordkeeping computing system, the employer computing system, the insurance server, and/or the user computing device. FIG. 4 does not imply any limitations with regard to the environments or embodiments that may be implemented. Modifications to the depicted environment or the embodiment shown in FIG. 4 may be made. While certain aspects may be illustrated herein with reference to a retirement account, it is expressly understood that these embodiments can be configured to apply to a variety of other financial services and investments.

At step 410, the analytics server may receive a request to generate a portable loan dataset. The analytics server may receive this request from an employee operating a computing device (such as the user computing device illustrated in FIGS. 2 and 3). The employee may electronically request a loan origination based on their retirement plan. The analytics server may generate and display (on the computing device) a graphical user interface (GUI), which is configured to receive, utilizing one or more input fields (e.g., drop down menus, radios buttons, input string fields, and the like), information regarding the employee, the employer, their retirement plan and the like. Utilizing the GUI provided by the analytics server, the employee may provide personal identification and identify his employer, the retirement account and/or plan. The employee may further request a loan to be originated based on their retirement plan and further provide details (e.g., loan amount, maturation date, repayment amount, and the like).

At step 420, the analytics server may retrieve employee data from the employer computing system and/or the recordkeeping computing system. The analytics server may generate an instruction configured to command the employer computing system and/or the recordkeeping computing system to transmit all data associated with any retirement plan associated with the employee. The instruction may include the identification information of the employee (received in step 410). For example, the instruction may identify the employee and request for all pertinent data, such as the retirement account terms and condition, attributes, and identification of the recordkeeper used. Once the instruction is transmitted to the employer computing system, the analytics server may receive a file or a dataset from the employer computing system that corresponds to one or more attributes of the employee. The attributes may include salary information, identification information of the employee, demographic information of the employee (e.g., terms and conditions, maturations date, payment history, annuitization data, identity information (SSN or alternate unique ID), name and address, email, current age or DOB, gender, marital status, current account balance, employment status/plan status, current total annual contribution amount (employee and employer), current annual income, desired guaranteed income at retirement, and projected retirement date, minimum withdraw benefit, and the like), employee contributions, employer contributions, status of employment, and the recordkeeper used. The analytics server may then identify a server associated with the recordkeeper in charge of the employee and transmit a second instruction to the recordkeeping computing system. As a result, the analytics server may retrieve (e.g., receive from the recordkeeper server) retirement plan data including current balance, investment providers, financial instruction in charge of the assets, and the like.

In some embodiments, the analytics server may utilize an application program interface (API) native to the employer computing system and/or the recordkeeping computing system and in direct communication with the analytics server. In those embodiments, the API may query data associated with the employee or the employee's retirement plan and automatically retrieve and transmit employee data to the analytics server.

The analytics server may also receive all the above-mentioned data from the employer's server. For example, the employer's server, upon receiving the first instruction from the analytics server, may query a server associated with the recordkeeper and transmit all the data directly to the analytics server. In other embodiments, the employer server may authorize the analytics server to receive the employee's investment data records from the recordkeeping computing system. For example, upon receiving an instruction from the analytics server, the employer's server may transmit a token to the analytics server and the recordkeeping computing system in order to uniquely identify and authorize the analytics server. A token is an electronic representation of an authorization grant from the employer's server and may include an alphanumerical string generated based on random values. The employer server may encrypt the data contained within the token using variety of existing methods in order to combat possible fraud. Continuing with the example above, the analytics server may then transmit the token to the recordkeeping computing system. The recordkeeping computing system may be configured to only transmit information upon recognition of the token. The recordkeeping computing system may confirm the identity of the token (by matching the token received from the analytics server to the token received from the employer server) and subsequently transmit the data records to the analytics server.

At step 430, the analytics server may map the data fields of the received/retrieved data records in order to identify attributes associated with the employee. In some configurations, as described above, the files and datasets received from the employer computing system and the recordkeeping computing system may not be consistent and/or compatible.

For instance, the employer computer system may have transmitted the employee dataset/files in a first format while the recordkeeping computer system may transmit one or more files in a second format. In some embodiments, the datasets received may include self-referential tables or data record that reference data stored in other files or databases. The above-mentioned technical problem may prevent a seamless and efficient data process by the analytics server. The analytics server may map all the data and generate a uniform data format in order to create portable dataset that are easily transferrable to different computing devices and are readily available to be digested by said computing devices.

Data mapping, as used by the analytics server, may refer to a process of creating data element mappings between two distinct data models (e.g., datasets received by the analytics server). The analytics server may use data mapping as a method for a wide variety of data integration tasks including data transformation or data mediation between data sources (e.g., recordkeeping computing system, employer computing system, and/or financial computing systems) and a destination (e.g., analytics server), identification of data relationships as part of data lineage analysis, or discovery of hidden sensitive data (such as the last four digits of a social security number hidden in another user id as part of data masking). The analytics server may use a variety of methods to map and identify attributes of employee's retirement plan or loan. A non-limiting examples of an attribute of a retirement plan or loan dataset may include but not limited to terms and conditions associated with the retirement plan, such as the amount of money invested, maturations dates/terms, risk assessment, and the like.

In some embodiments, data received from the employer server and data received from the recordkeeping computing system may not be in the same data format. For example, the employer may utilize a different computer environment, infrastructure, or ecosystem to create the employee datasets. The above-mentioned data format conflict has created a technical hurdle for conventional software solutions. Receiving large number of datasets from disparate data sources with different data types and file formats may create a technical hurdle to providing a collaborative investment platform. As a result, the analytics server maps different data fields and generates a unified portable loan dataset, which is data-format-agnostic and compatible with computing infrastructures utilized by the employer computing system, recordkeeping computing system, and the financial institution computing system. In a non-limiting example, an employer may store an employee's accounting information in pdf format and the recordkeeping computing system may store the employee's account information using a home-grown (in-house developed) software module. The analytics server may perform data mapping, extract the information, and create a unified portable dataset that is compatible with both of the above-mentioned parties (e.g., could be used by the recordkeeper and the employer). In some embodiments, the analytics server may convert the data to the appropriate data format before communicating with each party.

At step 440, the analytics server may generate a data-format-agnostic dataset for the employee. The data-format-agnostic dataset may include all the data received in steps 310-330 and all the data identified as a result of data mapping. By allowing the analytics server to adapt to the file format of each computing entity, the analytics server may increase efficiency of file transfer by eliminating the requirement to have rigid or uniform file types. The analytics server may also remove the need for manual data entry by creating a unified dataset.

Referring back to FIG. 4, at step 450, the analytics server may transmit the data-format-agnostic user dataset to an insurance provider server (e.g., insurance provider 230 as described in FIG. 2) and may receive actuarial data (e.g., insurance plan) from the insurance server. Actuarial data, as used herein, refers to the statistics used to calculate various risk associated with the retirement plan and a likelihood that the employee may cease payments before the retirement loan has been fully repaid. Simply put, the insurance plan provides coverage in the event of a job separation subjecting the loan to potential default. The insurance server may insure the retirement loan in exchange for a premium (e.g., monthly or a lump sum payment) and transmit the requested premium to the analytics server.

In some configurations, the analytics server may request actuarial data from more than one insurance server. For example, the analytics server may transmit the data-format-agnostic user dataset to multiple insurance servers in order to compare premiums and offer a variety of actuarial services (e.g., different insurance coverages and plans) to the employee. Even though the insurance provider server is described as being operated by a separate and distinct entity, in some configurations, all functions performed by the insurance provider server may be performed by the analytics server. For example, the analytics server may be operatively coupled to an entity that also provides actuarial services in addition to generating a portable loan dataset and/or securing a loan.

At step 460, the analytics server may receive a selection from the user computing device and transmit the selection to the other computing systems (e.g., employer computing system and/or recordkeeping computing system). The analytics server may display loan and actuarial data on the graphical user interface provided on the user computing device. The analytics server may also display different insurance premiums calculated by different insurance servers. For example, the graphical user interface may display employee attributes (e.g., age, salary, and the like), loan attributes received from the recordkeeping computer system (e.g., loan amount, repayment data, and the like), and one or more insurance plans (e.g., premium, coverage data, and the like). The graphical user interface may also include one or more graphical interfacing components, such as input fields, drop down menus, string input fields, and the like. The analytics server may receive one or more selections (e.g., the employee's selection of an insurance plan or coverage) and may transmit the selection to the employer computing system, the selected insurance server, and/or the recordkeeping computing system. In response to the employee selecting an insurance coverage and acknowledging the repayment terms and conditions, the analytics server may transmit the employee's selection to the insurance server along with the data-format-agnostic user dataset generated in step 440. The analytics server may also transmit the data-format-agnostic user dataset and the employee's selections (i.e., the employee's confirmation of the terms and conditions) to the recordkeeping computing system and the employer computing system. Subsequently, the recordkeeping computing system may originate the retirement loan.

At step 470, the analytics server may continuously monitor disparate data sources to identify a status change associated with the user. The analytics server may periodically query the employer computer system, the recordkeeping computer system, and/or other public databases in order to determine whether the user has had a status change affecting the repayment of the retirement loan. For instance, the analytics server may periodically query the data record of the employer computing system in order to determine whether the user is employed. The analytics server may also query the data records of the recordkeeping computing system or the financial institution computing system to determine whether the employee has missed any payments. The analytics server, in some configurations, may continuously scan one or more public data sources to determine whether the employee has had a change of employment. For instance, the analytics server may web-crawl different social networking databases and webpages associated with the employee or the employer and determine whether an employment status of the employee has changed. For example, the analytics server may determine whether the employee has indicated an employment change on a social networking or an employment website. In other embodiments, the analytics server may utilize the same methods to identify other factors that could potentially impact the retirement loan (e.g., job separation). For example, if the employee has found a new job or if the employee's social media posts indicate that the employee has voluntarily left the employment, then the employee's benefits may cease.

In some embodiments, the monitoring and/or transmitting confirmation signal may be performed in real time or near real time. For instance, the protocols described above may be performed in a way that the user's status change is determined in real time. In some embodiments, the employer server and/or the insurance server transmits a notification signal identifying the user's status as changed. In some configurations, the analytics server may receive this indication directly from the user. In some configurations, the analytics server may determine that the user has terminated their payments and identify that the user's status has changed.

At step 480, upon receiving an indication that the employee's status has changed, the analytics server may generate and transmit a notification to the user computing device requesting the employee to confirm their employment status. The notifications may also include reason(s) why the analytics server has determined that the employee's employment status has changed. For example, when a repayment has been delayed (or missed) the recordkeeping computer system may transmit a notification to the analytics server. Subsequently, the analytics server may transmit an electronic message to the user computing device (e.g., displayed on the graphical user interface of the user computing device) notifying the employee that he/she has missed at least one payment. The electronic message may also request the employee to confirm their employment status. In some configurations, the analytics server may also contact the employer computing system and request the employer to confirm the employment status. In some embodiments, the analytics server may query a unique identifier (e.g., IP address) as an electronic signature and to ensure authenticity of the confirmation.

In addition to the above-described notification, the analytics server may also transmit a secondary notification to one or more computing devices associated with the user, notifying the user that the analytics server has identified a status change for the user. The notification may also display the status of the user's loan balance, the user's status, the loan premium, and the like.

Figure 5:
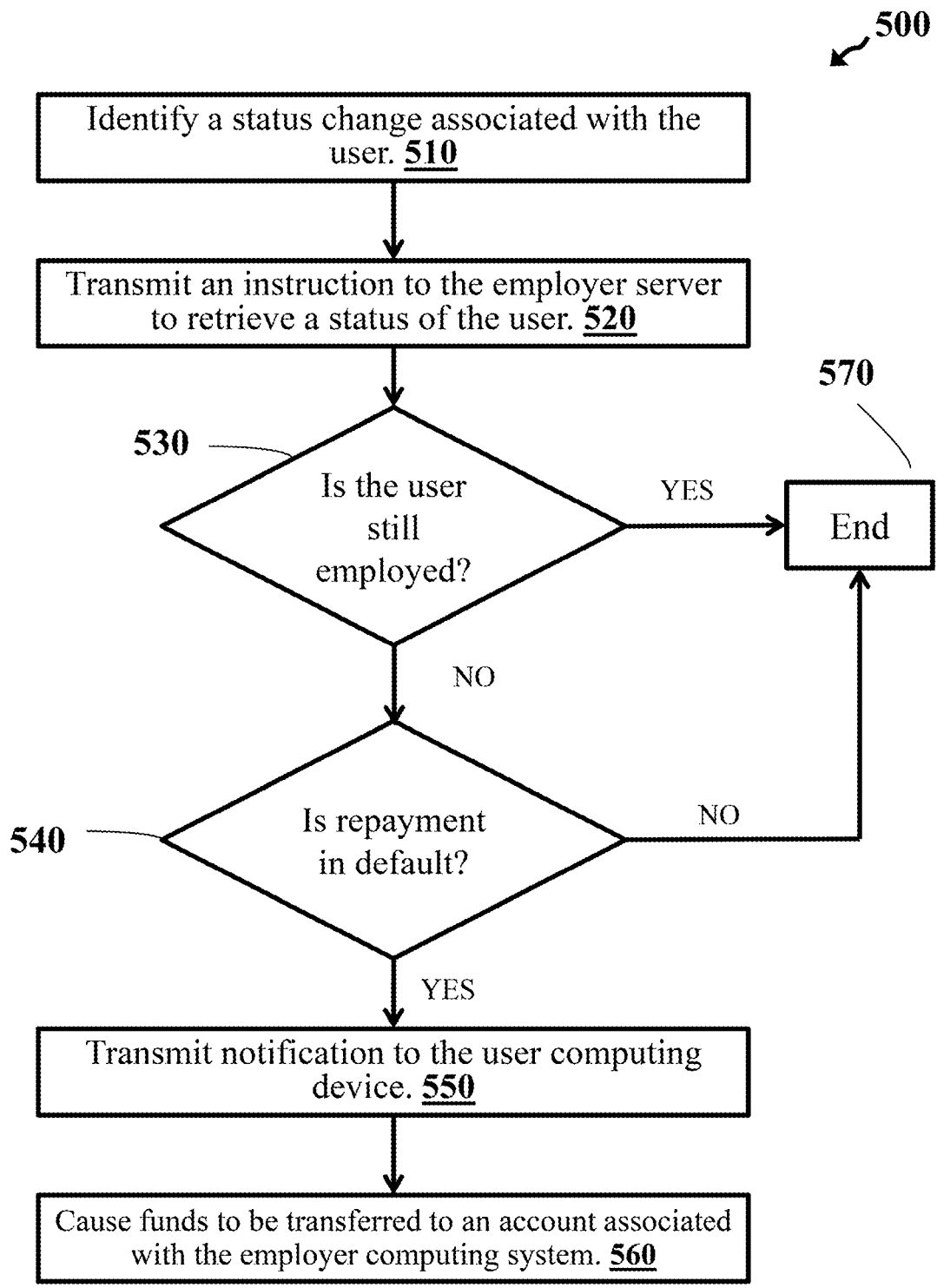

Referring now to FIG. 5, a flowchart depicting operational steps of a method for identifying an employee status change is illustrated. Steps of the method 500 may be implemented using the analytics server, the recordkeeping computing system, the employer computing system, the insurance server, and/or the user computing device. FIG. 5 does not imply any limitations with regard to the environments or embodiments that may be implemented. Modifications to the depicted environment or the embodiment shown in FIG. 5 may be made. While certain aspects may be illustrated herein with reference to a retirement account, it is expressly understood that these embodiments can be configured to apply to a variety of other financial services and investments.

At step 510, the analytics server may identify an employment status change. As described above, the analytics server may continuously monitor the employee's employment status by periodically querying various computing systems described above (e.g., employer computing system, recordkeeping computing system, and/or user computing device). Additionally or alternatively, the analytics server may also monitor other internal or external data sources to determine whether the employee's status has changed. At step 520, when the analytics server receives an indication that the employment status has changed (e.g., the user has missed a payment or the user has changed their employment status on a social networking website), the analytics server may query the employer computing system to confirm whether the employee is still employed. In some configurations, the analytics server may utilize an API and automatically retrieve employee's status without any human intervention. At step 530, if the employee is still employed, method 500 ends (step 570). If the employee is no longer employed, the analytics server may determine whether the retirement account repayment is in default. For instance, the analytics server may query (using any of the above-mentioned methods) the recordkeeping computing system and determine whether the employee has missed any payments. If the analytics server determines that the employee has not defaulted, method 500 ends (step 570). However, if the employee has defaulted, at step 550, the analytics server may transmit an electronic message to the employee notifying the employee regarding the default. The analytics server may optionally proceed to step 560 and cause funds to be transferred to an account associated with the employer computing device, as described in the step 490.

In some configurations, the analytics server may only determine that the employee has defaulted if the employee has not cured the default within a pre-determined time period. For example, if an employee misses a payment (and the employee is still employed), the user may be provided with a pre-determined time period to cure the default. In those embodiments, the analytics server may only proceed to step 590 when the user is not employed and has not cured the default within the allotted time period.

Referring back to FIG. 5, at step 590, upon receiving confirmation that the employee is no longer employed (due to a job separation event), the analytics server may notify the insurance server and cause funds to be transferred to an account associated with the employer computing system (e.g., the central trust for all retirement participants). In some embodiments, the analytics server may transmit an instruction to the insurance server along with data indicating that the employee has had a status change affecting repayment of the retirement loan wherein the instruction requests that the insurance server transfers funds to the account of the employer. In some configurations, the analytics server may instruct the recordkeeping server to transmit latest account data (e.g., latest balance) and may update the data-format-agnostic loan dataset accordingly.

Figure 6:
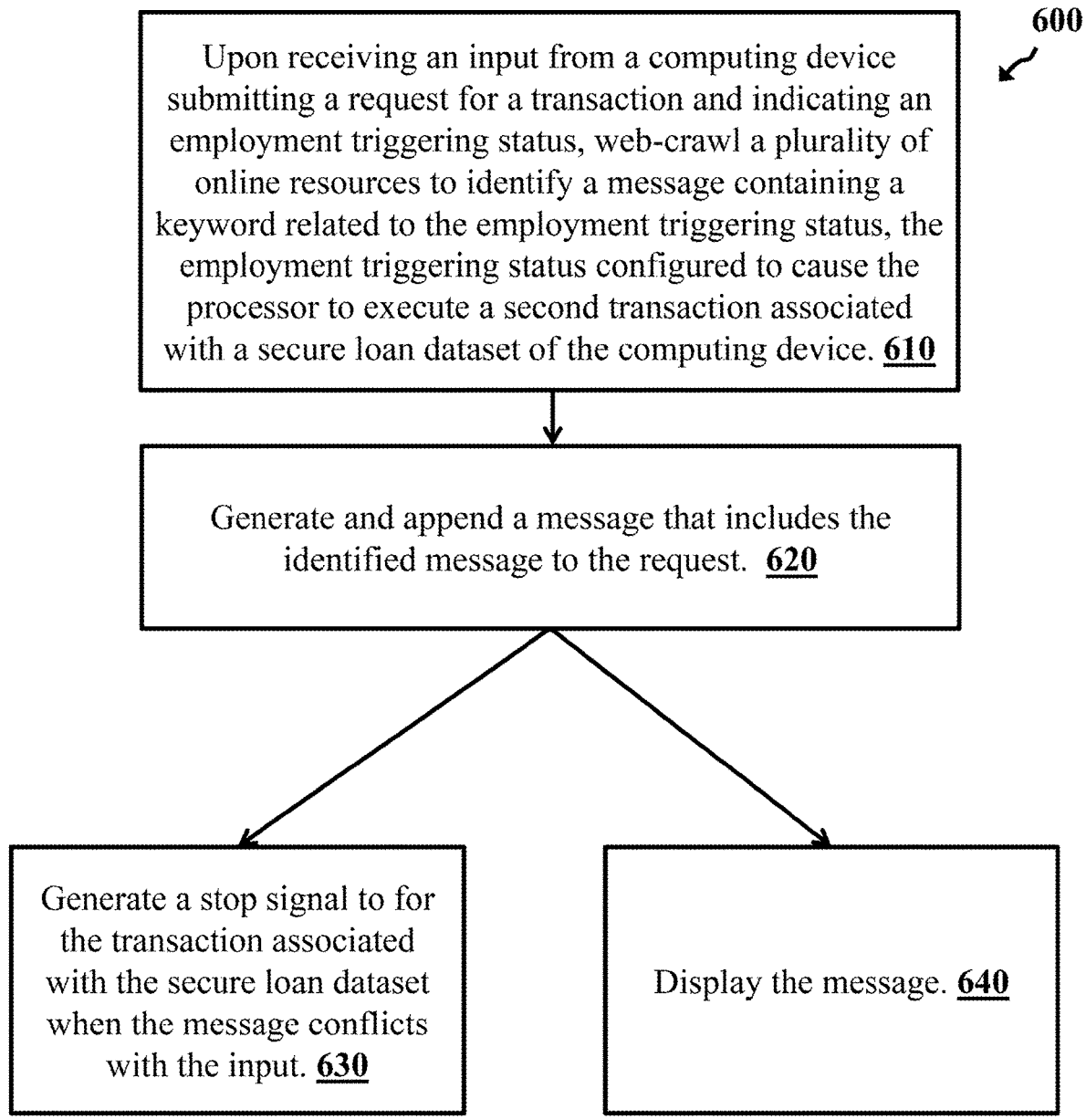

Referring now to FIG. 6, a flowchart depicting operational steps of a method for generation, modification, and transmittal of a portable retirement plan dataset is provided. Steps of the method 600 may be implemented using the analytics server, the recordkeeping computing system, the employer computing system, the insurance server, and/or the user computing device. FIG. 6 does not imply any limitations with regard to the environments or embodiments that may be implemented. Modifications to the depicted environment or the embodiment shown in FIG. 6 may be made.

While certain aspects may be illustrated herein with reference to a retirement account, it is expressly understood that these embodiments can be configured to apply to a variety of other financial services and investments.

At step 610, the analytics server may, upon receiving an input from a computing device submitting a request for a transaction and indicating an employment triggering status, web-crawl a plurality of online resources to identify a message containing a keyword related to the employment triggering status, the employment triggering status configured to cause the processor to execute a second transaction associated with a secure loan dataset of the computing device.

The analytics server may generate various instructions that, when executed, would cause a server to search (e.g., web-crawl) various electronic documents to determine whether any of the electronic documents include one or more keywords within a pre-determined list of keywords. The instructions may be executed by a third-party server or the analytics server itself. For instance, the analytics server may transmit the instructions to one or more servers and cause the servers to web-crawl various data sources. In another example, the analytics server may itself perform the web-crawling.

The instructions may also include one or more pre-defined keywords, such as job, employment, new, and the like. The analytics server may retrieve the list of pre-defined keywords from a data table stored within a database. A system administrator of the employer computing system, recordkeeping computing system, and/or financial institution computing system may access the data table to add, delete, update, and/or revise the list of keywords. For instance, the administrator may include keywords that would indicate a job status change for a participant.

The analytics server may execute the instructions or instruct another server to execute the instructions to identify electronic content created by the participant that includes the keywords. The analytics server may web-crawl various online sources (e.g., publicly available websites, social medial sites, job hunting sites, and/or forums) to find content that was created by the participant that also includes one or more of the keywords. For instance, a participant may have directly indicated (e.g., in a social media post) that the participant has found a new job. In those embodiments, the analytics server can determine that the participant is no longer unemployed. In another example, the electronic content may not be directly created by the participant. For instance, the participant may change a profile status on a social media site (e.g., change an employment status from unemployed to employed). In turn, the social media site may change the participant's profile. As a result of web-crawling, the analytics server may identify the status change and determine that the participant has found new employment.

In another example, the analytics server may analyze various electronic content identified in totality to determine whether the participant is no longer unemployed. For instance, a participant may have rescinded their social media status indicating that the participant is "unemployed." While this data is not dispositive proof that the participant has found new employment, it can be recorded and analyzed by the analytics server in conjunction with other electronic content created by the participant (e.g., other social media content). The analytics server may execute various analytical protocols (e.g., modeling techniques) to identify a likelihood of the participant being re-employed. For instance, the analytics server may analyze multiple social media posts and other online activity associated with the participant to generate a score for the participant. The score may indicate a likelihood of the participant being re-employed.

In some embodiments, the analytics server may execute one or more artificial intelligence models, such as natural language processing models, large language models, and/or sentiment analytical models to identify a sentiment associated with one or more of the electronic documents identified as a result of web-crawling. For instance, the models may indicate a likelihood that the participant has found a new job.

At step 620, the analytics server may generate and append a message that includes the identified message to the input. The analytics server may generate an electronic file that includes the electronic content retrieved via web-crawling (step 610). The file may include an indication of the content identified. For instance, upon identifying electronic content that includes one or more keywords, the analytics server may execute a web-scraping application to generate a screenshot of the electronic content. In a non-limiting example, the analytics server may identify a social media post published by the participant that includes at least one keyword (e.g., the participant has described their new job). The analytics server may generate an image of the post and a timestamp associated with the post.

At step 630, the analytics server may generate a stop signal to for the transaction associated with the secure loan dataset when the message conflicts with the input. The analytics server may generate an instruction to stop one or more transactions associated with the participant's secure loan dataset. The analytics server may first query one or more databases to identify a scheduled transaction associated with the participant's secure loan. The analytics server may then generate an instruction to stop one or more servers from facilitating the scheduled transaction. The instruction may include a unique identifier associated with the participant and/or the participant's account. The analytics server may then transmit the instruction to one or more servers associated with the participant and/or the participant's secure loan dataset.

Before sending the stop signal, the analytics server may analyze the retrieved/identified content to determine whether the content indicates a change in the participant's employment status. The analytics server may display the electronic file on a system administrator's computer where the system administrator can confirm whether the participant has had a change of employment status. Additionally or alternatively, the analytics server may automatically analyze the retrieved content by executing various analytical protocols, such as natural language processing techniques.

In a non-limiting example, the retrieved content may include keywords without necessarily indicating that the participant has a new employment status. For instance, the participant may have discussed a new job in a social media post, causing the analytics server to flag the social media post. However, the social media post may not necessarily indicate that the participant is now employed. The analytics server may display a screenshot of the social media post on an administrator's computer and the administrator may determine that the social media post is not indicative of an employment status change. Additionally or alternatively to step 630, the analytics server may display the electronic file on an electronic platform associated with the participant.

In a non-limiting example, a participant of a secure loan may access an electronic platform (e.g., website) to request a transaction associated with a secure loan. The participant may have previously enrolled in secure loan services provided by an entity associated with the analytics server. The participant may access the platform to confirm that the participant has left their job and is not currently employed. The participant may also use the platform to request a transaction, such as a payment to offset the lost income. The participant may be required to periodically confirm that the participant has remained unemployed.

Upon receiving an indication that the participant has confirmed that the participant is still unemployed, the analytics server executes a web-crawling protocol and identifies a status update posted by the participant on a social media website indicating that the participant has started a new position. As a result, the analytics server generates an instruction to stop further transactions associated with the participant's secure loan and transmits the instruction to the employer computing system, recordkeeping computing system, and/or the financial institution computing system. The instruction informs the recipient server that the participant's response has been flagged as potentially fraudulent and may delay payment for a pre-determined time (e.g., a day or any other defined period of time). Alternatively, the instruction may delay payment until further verification has been performed.

In another non-limiting example, the analytics server may dynamically display a prompt on the platform being viewed by the participant (step 640). The prompt may request the participant to confirm their employment status. The prompt may also include a screenshot of the social media post. The prompt may further include an additional input element that is configured to receive a revised input from the participant (e.g., allowing the participant to correct their previous input indicating that the participant is not employed).

Figure 10:
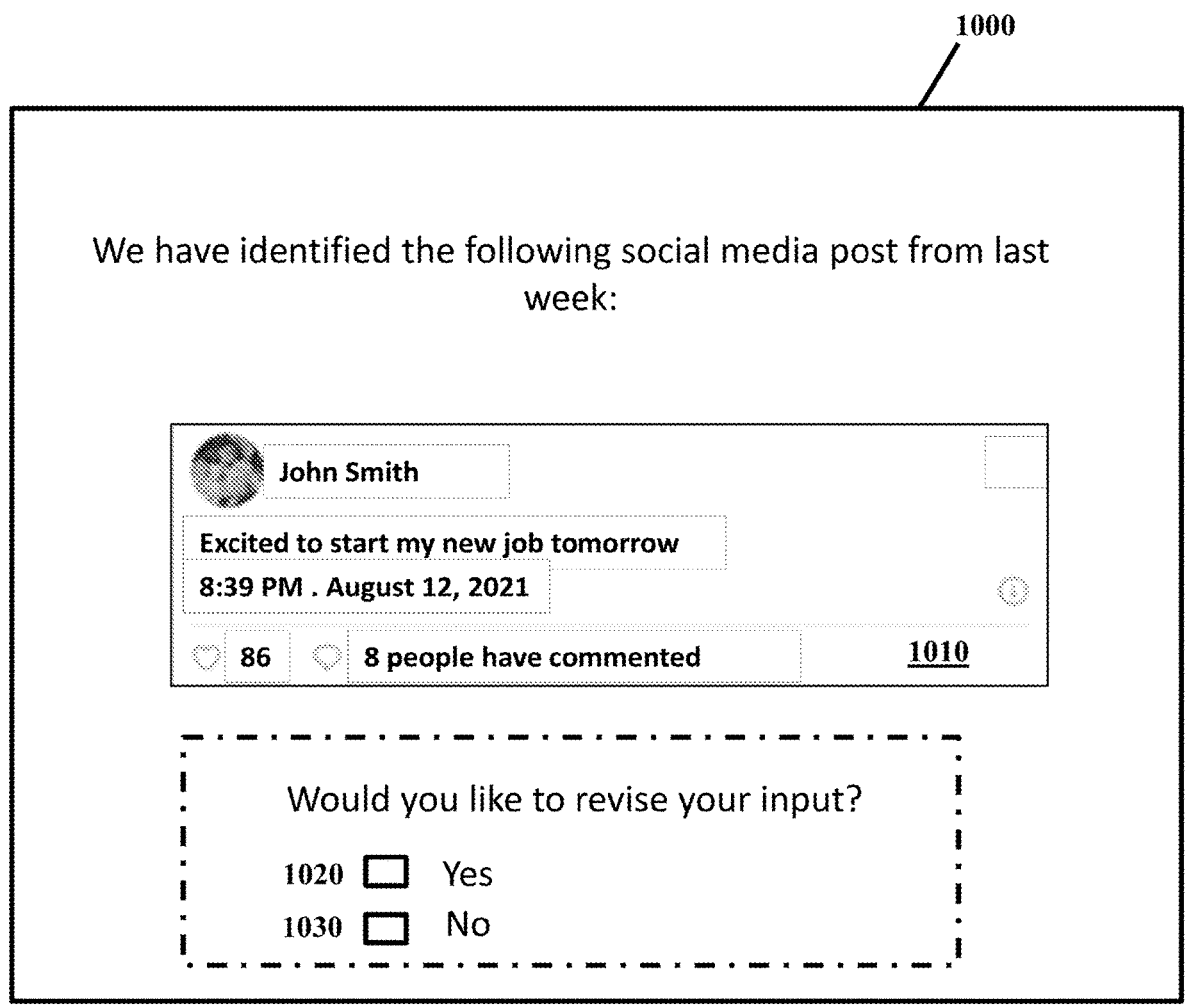
FIGS. 10-13 illustrate graphical user interfaces associated with processing loan datasets, according to embodiments.

A non-limiting example of a prompt is depicted in FIG. 10. The analytics server may display a prompt 1000 on the participant's computing device. For instance, after the participant submits their response confirming that the participant is still unemployed, the analytics server provides the prompt 1000 that displays the message 1010 identified using the web-crawling protocols discussed herein. The message 1010 indicates that the participant may be employed. The prompt 1000 may also include input elements 1020, 1030 allowing the participant to change their response.

Referring back to FIG. 6, as illustrated, the analytics server may execute the step 640 in conjunction with or instead of the step 630. For instance, in some embodiments, the analytics server may only transmit a stop signal to a second server that causes the second server to stop a payment associated with the secure loan dataset. Additionally or alternatively, the analytics server may display the message (e.g., social medial post) on the computing device of the participant and allow the participant to revise their input (e.g., allow the participant to correct the answer that has now been identified as potentially untrue). The analytics server may also display and/or otherwise transmit the message on a computing device of an administrator of the financial institution computing system, recordkeeper computing system, and/or employer computing system.

In some embodiments, the message (what was found as a result of web-crawling) can be displayed on an administrator's computer.

Figure 7:
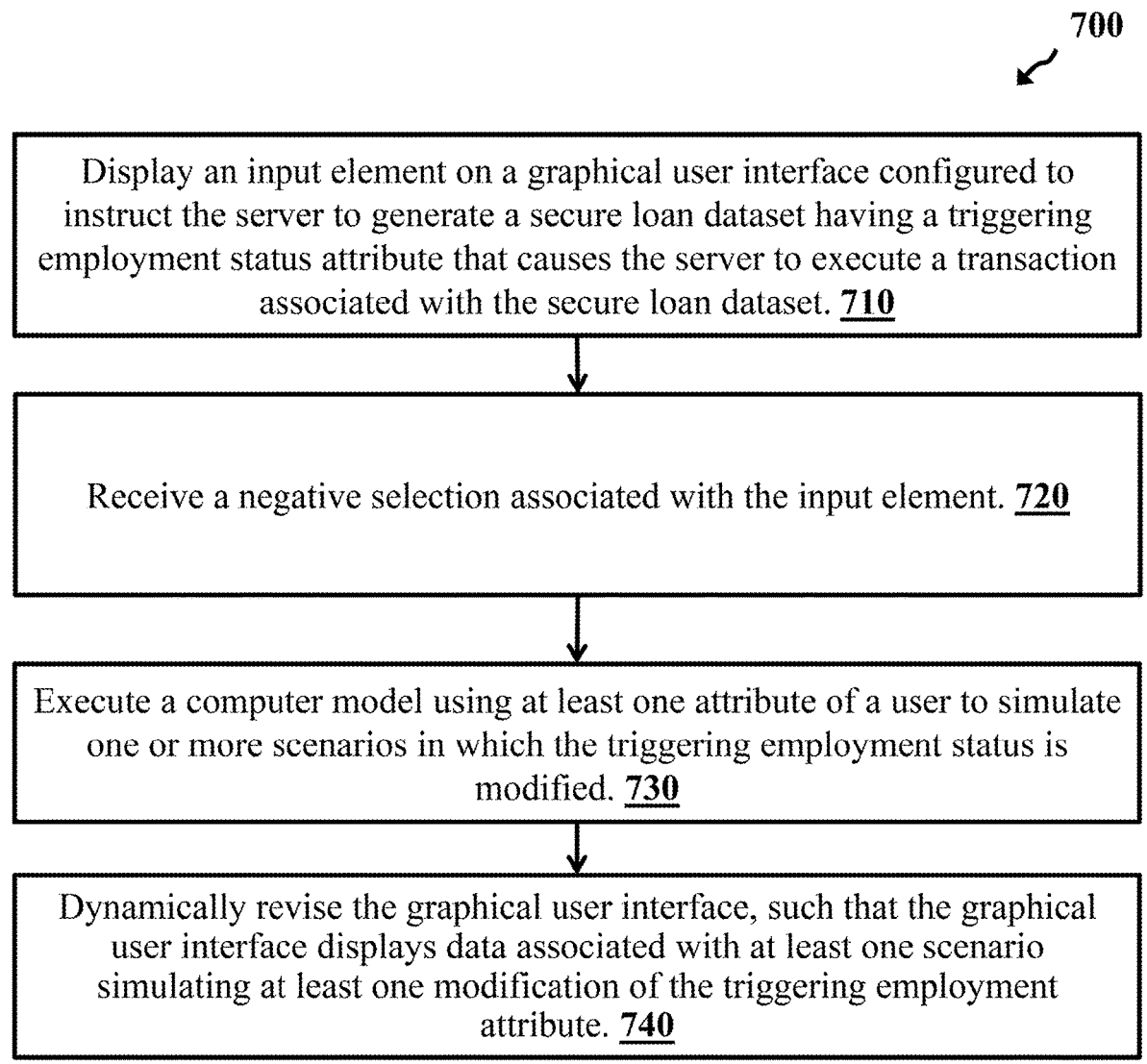

Referring now to FIG. 7, a flowchart depicting operational steps of a method for the generation, modification, and transmittal of a portable retirement dataset is provided. Steps of the method 700 may be implemented using the analytics server, the recordkeeping computing system, the employer computing system, the insurance server, and/or the user computing device. FIG. 7 does not imply any limitations with regard to the environments or embodiments that may be implemented. Modifications to the depicted environment or the embodiment shown in FIG. 7 may be made.

At step 710, the analytics server may display an input element on a graphical user interface configured to instruct the server to generate a secure loan dataset having a triggering employment status attribute that causes the server to execute a transaction associated with the secure loan dataset.

As described herein, the analytics server may be associated with an entity generating and providing secure loan datasets. For instance, the analytics server may facilitate a loan insurance for loans generated from participants' retirement accounts. As a result, when a participant initiates a loan from the retirement account using an electronic platform, such as a website of an employer and/or a recordkeeping company, the participant may be directed to a webpage that provides information regarding a secure loan dataset. The website, for example, may include terms and conditions regarding a secure loan dataset. Specifically, the website may inform the participant that the participant may enroll in a program provided by the analytics server that can reduce the participant's risk if the participant loses their job. In some embodiments, the participant may be required to deny services from the analytics server before completing the loan application. For instance, the participant may be required to input (using various input elements such as a radio button, text box, or drop-down menu) that the participant is not interested in a secure loan.

In operation, the analytics server may be monitoring an electronic platform used by the participant to initiate the loan from their retirement account. For instance, the analytics server may use various application programming interfaces (APIs) and/or pluggable components to monitor the participant interactions with the platform. As a result, when a participant requests a loan to be initiated from their retirement account, the analytics server may either direct the participant to a new webpage or may reconfigure the webpage to include data associated with secure loan dataset. For instance, the analytics server may include an input element configured to receive a selection from the participant regarding whether the participant is interested in a secure loan (e.g., a loan that is secured against a possible default).

At step 720, the analytics server may receive a negative selection associated with the input element displayed in step 710. For instance, upon displaying information regarding a secure loan dataset, the participant may decide against securing their loan.

At step 730, the analytics server may execute a computer model using at least one attribute of a user to simulate one or more scenarios in which the triggering employment status is modified. Upon receiving a negative selection from the participant, the analytics server may execute a computer model that simulates different scenarios that could take place. For instance, in one scenario, the participant may lose their employment and may not be able to repay the loan. As a result, the participant may be in default, which may require the participant to pay additional fees or the entire loan amount.

The computer model may use various statistic or stochastic algorithms to simulate an outcome for the participant. In some embodiments, the computer model may be an artificial intelligence (AI) model trained specifically to predict the likelihood of a triggering condition (e.g., loss of employment).

To train the artificial intelligence model, the analytics server may first generate a training dataset that includes previously known data ("ground truth" data). Specifically, the analytics server may retrieve and aggregate data associated with previously initiated secure loans (e.g., loans benefiting from services provided by the analytics server) and unsecured loans (e.g., loans for which services provided by the analytics server were denied by participants). Specifically, the training dataset may include outcome data associated with the participants, employers, and loans. For instance, the training dataset may include data associated with previous participants who had denied services provided by the analytics server (and therefore had an unsecured loan) who lost their employment. The training dataset may also include financial information associated with those loans, such as fees and other financial obligations attached to unsecured loans after the participant lost their job.

The analytics server may also include various pre-determined scenario templates within the training dataset. For instance, the analytics server may generate scenarios in which a potential participant misses payments and the corresponding timing and amount (e.g., when and how much each potential participant misses their payment). Additionally or alternatively, the analytics server may include time series data of other loan defaults, employment losses, and other data associated with different employers combined with micro-economic and macro-economic factors. For instance, the analytics server may retrieve historical data associated with layoffs and firings, and analyze how they correspond to various economic factors, such as stock values, GDP, and the like. Using this information, the computer model can estimate a likelihood for loss of employment for the participant. Using the training dataset, the analytics server may train the computer model, such that the computer model can predict various scenarios associated with each loan.

At step 740, the analytics server may dynamically revise the graphical user interface, such that the graphical user interface displays data associated with at least one scenario simulating at least one modification of the triggering employment attribute.

Upon executing the computer model, the analytics server may simulate different scenarios for the participant. The scenarios include situations where the participant loses their employment and potentially misses a payment. For each scenario, the analytics server (via the computer model) may calculate potential fees and other financial obligations for the participant. When different simulation scenarios are generated, the analytics server may instruct the webserver to dynamically revise the graphical user interface (e.g., a webpage being viewed by the participant) to include one or more graphical elements corresponding to the predicted scenarios.

The analytics server may display various visual representations of each scenario using pie charts, bar graphs, and the like to illustrate a possible outcome for the participant if the participant denies services provided by the analytics server (e.g., if the participant decides to obtain an unsecured loan). For instance, the analytics server may display a total amount of fees, taxes, and other financial obligations that would occur if the participant chooses to continue with an unsecured loan dataset and loses their employment.

Figure 11:
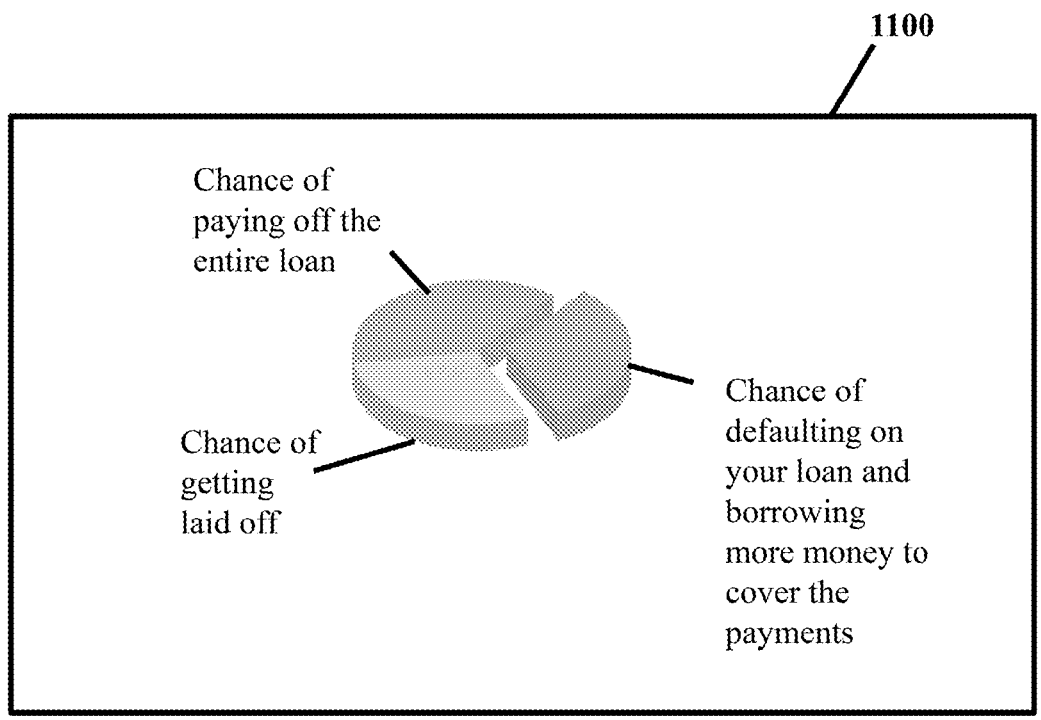
Figure 12:
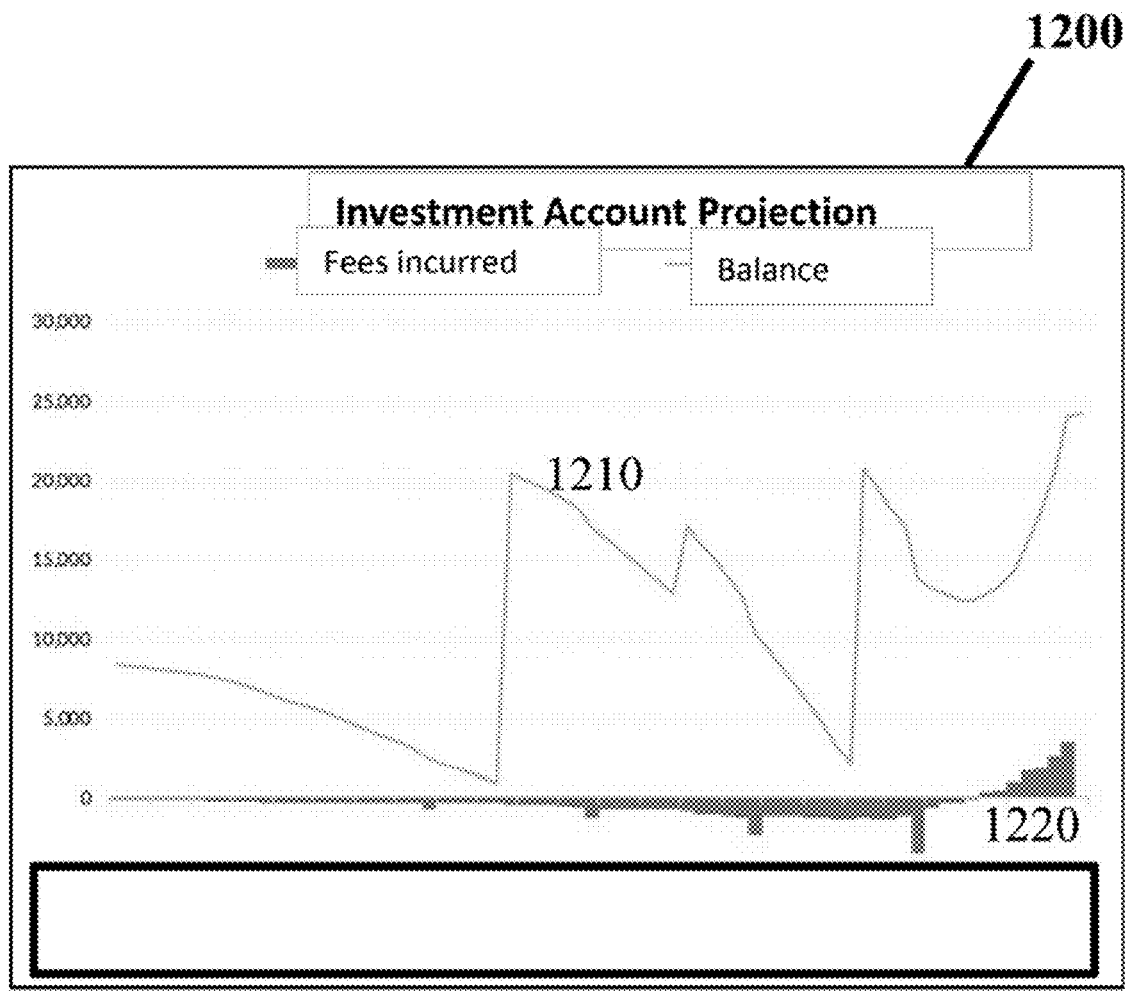
Figure 13:
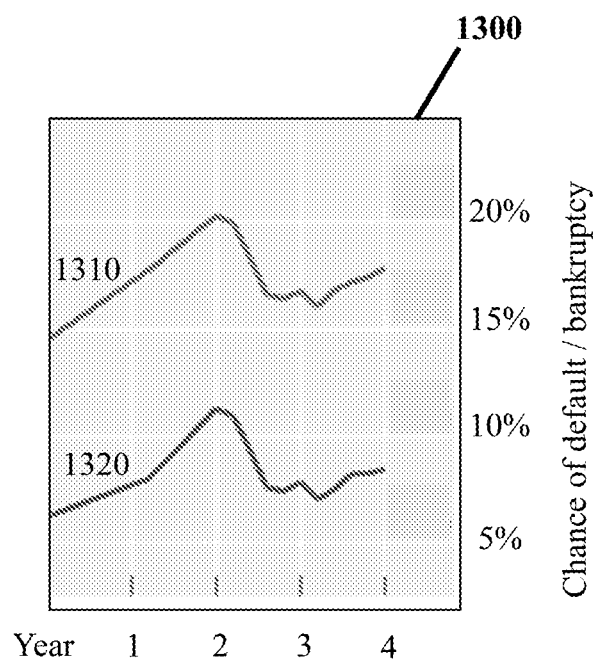

Referring to FIGS. 11-13, different examples of visual representations for one or more scenarios is represented. The analytics server may revise the graphical user interface displayed on a participant's computing device and display one or more of the visualizations discussed herein, though the visualizations are not limited to the ones depicted in FIGS. 11-13. Referring to FIG. 11, the pie chart 1100 displays a visual representation in which the analytics server depicts the participant's chances of defaulting and borrowing more money to cover the payments, chances of the participant not defaulting and paying off the entire loan, and chances of the participant getting laid off or otherwise unemployed.

Referring to FIG. 12, a visualization 1200 represents a projection of the participant's retirement/investment account during the loan term (and in case of a loan default). The analytics server may predict a possibility of an unsecure default (due to loss of employment) and may simulate a balance of the participant's 401(k) account (e.g., line 1210). The analytics server may also project fees incurred as a result of defaulting (e.g., bar chart 1220).

Referring to FIG. 13, a visualization 1300 represents a projection of a likelihood of default by the participant and bankruptcy/insolvency of the employer (plan sponsor). As discussed above, the analytics server may execute the computer model using data associated with the user/participant and data associated with the employer. As a result, the analytics server may project a chance of layoff for the user (e.g., 20% chance of being laid off on year 2 of the loan term as depicted by line 1310). Additionally, the analytics server may project a chance of bankruptcy or insolvency for the employer (line 1320). This projection may be helpful to understand why the analytics server has projected a chance of layoff for the user. For instance, the user has a higher chance of being laid off on year two because the user's employer has a higher chance of financial hardship around the same time.

In a non-limiting example, a participant may access a website to initiate a loan from their retirement account. The webserver of the website may notify the analytics server that the participant is initiating a loan that could be secured. The analytics server may then instruct the webserver to display on the website the terms of conditions for securing the loan. The analytics server may also instruct the webserver to display an input element to receive a selection from the participant. When the webserver notifies the analytics server that the participant has denied securing the loan, the analytics server may execute a computer model that simulates fees and penalties incurred as a result of the participant losing their employment. The analytics server then instructs the webserver to display the simulated scenarios.

Figure 8:
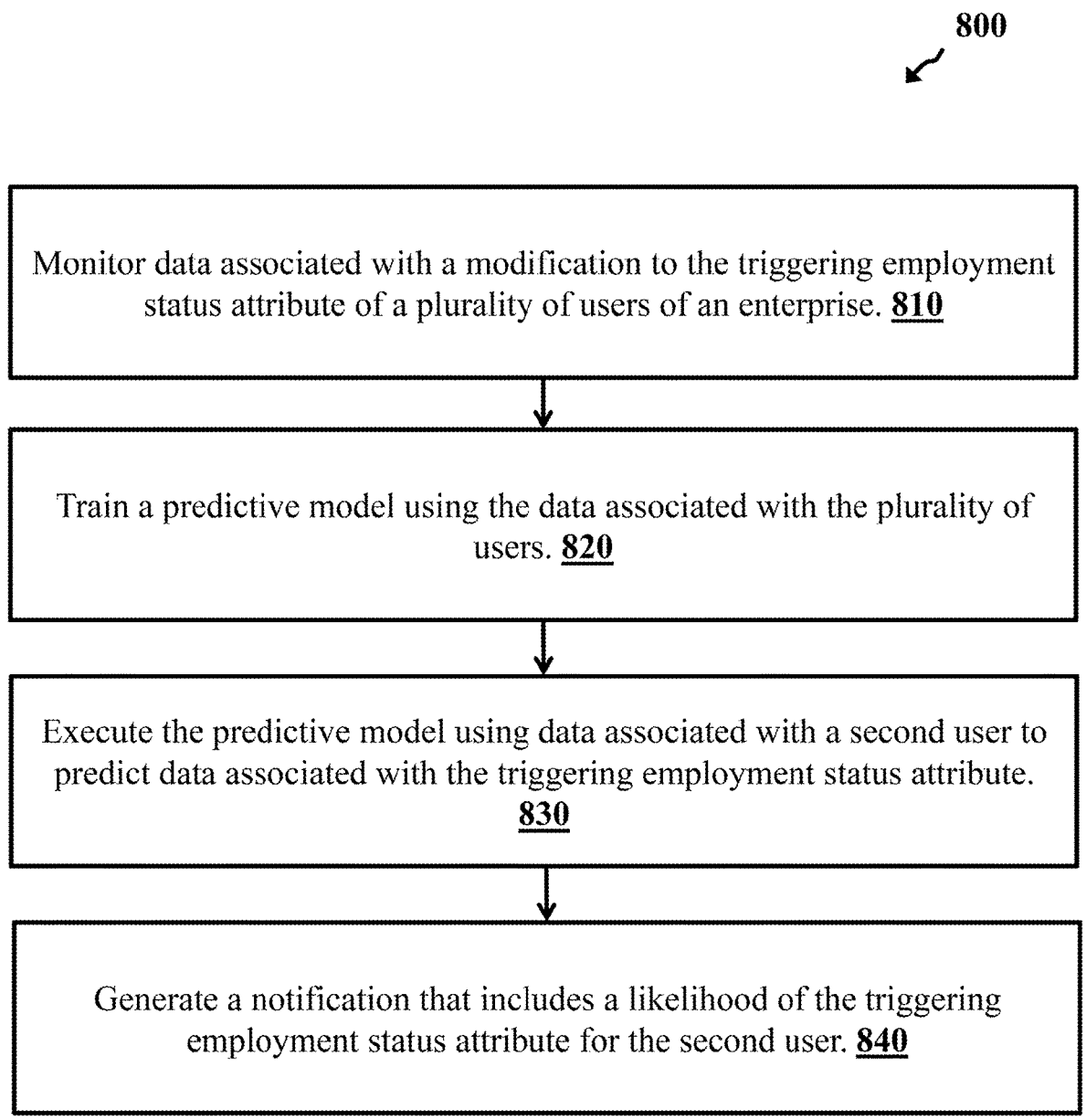

Referring now to FIG. 8, a flowchart depicting operational steps of a method for predicting a score for a participant is provided. Steps of the method 800 may be implemented using the analytics server, the recordkeeping computing system, the employer computing system, the insurance server, and/or the user computing device. FIG. 8 does not imply any limitations with regard to the environments or embodiments that may be implemented. Modifications to the depicted environment or the embodiment shown in FIG. 8 may be made. While certain aspects may be illustrated herein with reference to a retirement account, it is expressly understood that these embodiments can be configured to apply to a variety of other financial services and investments.

At step 810, the analytics server may monitor data associated with a modification to the triggering employment status attribute of a plurality of users of an enterprise. The analytics server may monitor data associated with a modification to the triggering employment status attribute of the user. The analytics server may use various methods to collect data associated with the triggering employment status of one or more users. In one example, when an employment status attribute has changed, the analytics server may automatically retrieve demographic data associated with the participant and the plan sponsor. The analytics server may use an API to monitor and collect data associated with users and plan sponsors (employers).

In a non-limiting example, the analytics server may provide an electronic platform, such that a system administrator or a representative of the plan sponsor (e.g., employer's human resources department members) can access to input data associated with the triggering of employment status attributes. For instance, when an employee is terminated, an administrator from the employer may access the platform and respond to various questions, such as cause for termination, hourly rate, complaint (if any), and the like. Additionally or alternatively, the analytics server may use automated methods (e.g., an API) to retrieve pertinent data. For instance, when the analytics server receives an indication that an employee is terminated, the analytics server may instruct/cause an API to retrieve all data records associated with the employee from the employer's database.

The analytics server may enrich the data retrieved using data associated with the employer. For instance, in addition to retrieving employee data, the analytics server may also collect data associated with the employer, such as the number of employees, the number of employees terminated, the date/cause for each terminated employee, the number (and type) of complaints which resulted in the termination, and the like. The analytics server may also retrieve employer financial information (e.g., earnings, budgets, losses, assets, accounts receivable) and other micro-economic and macro-economic factors. The analytics server may retrieve micro-economic and macro-economic factors from a third-party database. The analytics server may also retrieve risk score associated with an entity, such as Moody scores or Frisk scores.

At step 820, the analytics server may train a predictive model using the data associated with the plurality of users. The analytics server may train the predictive model (AI model) using the data, such that the AI model is configured to predict data associated with the triggering employment status attribute for a second user. The analytics server may generate, train, calibrate, and execute the AI model that can utilize data associated with previous participants and plan sponsors. In a conventional approach, a human reviewer may receive a report indicating data associated with a plan sponsor and the employee, and then label the data accordingly.

As discussed with respect to FIG. 7 (e.g., step 720), the analytics server may first generate a training dataset that includes previously known data ("ground truth" data). Specifically, the analytics server may aggregate the monitored data (step 710) into the training dataset. If the AI model is trained using a supervised method, the analytic server may either directly label the ground truth data or facilitate the labeling by a human reviewer or a third party reviewer. The analytics server may train the AI model using various machine learning techniques and the generated training dataset (e.g., dataset that includes data retrieved in step 810). Specifically, the analytics server may use a supervised, unsupervised, and/or semi-supervised learning method to train the AI model. Additionally or alternatively, the analytics server may use a reinforcement learning method to train the AI model. The amount of available data may dictate the type of machine learning technique used. Once trained, the AI model may be configured to predict a likelihood of an employee's termination, based on employee or employer data (or other economic data).

In the supervised learning method, the analytics server may use labeled data within a training dataset and use various clustering methods and other machine learning techniques to learn how employee, employer, and economic data relate to the employee's termination. Because the training dataset comprises historical data known to be accurate, the AI model may train itself, such that the AI model can identify patterns that correspond to the attributes giving rise to the employee's termination. These patterns may be undetectable using conventional status algorithms.

In a non-limiting example of the analytics server implementing an unsupervised machine learning technique, the analytics server may repeat similar steps as the supervised techniques. However, the analytics server may not designate the training dataset as the ground truth. For instance, the analytics server may not label the data. As a result, the AI model may infer the structures, patterns, and correlations present within the training dataset. The AI model may use clustering and density estimation techniques to identify the inherent structure of data without using explicitly provided labels, such as provided in the supervised learning method. In operation, the analytics server may input the data retrieved (step 810) and the AI model may train itself using machine learning techniques, such as K-means clustering.

The analytics server may not be limited to the above described machine learning techniques. For instance, the analytics server may use both techniques, wherein the analytics server may label data and use a supervised training method (e.g., certain portions of the data are labeled as ground truth), when each is applicable. If the analytics server cannot verify the accuracy of portions of the data retrieved, the analytics server may use an unsupervised training method. Therefore, the analytics server may use a semi-supervised method to train the second AI model. The analytics server may also utilize reinforcement learning to train the second AI model.

During training, the analytics server may iteratively produce new predicted results (recommendations) for employees. If the predicted results do not match the real outcome, the analytics server continues the training unless and until the computer-generated recommendation satisfies one or more accuracy thresholds and is within acceptable ranges. For instance, the analytics server may bifurcate the training dataset into two groups. The analytics server may train the AI model based on the first group. The analytics server may then execute the trained AI model to predict results for the second group of data. For instance, the analytics server may execute the AI model for employees (based on each employee's unique dataset) to predict a likelihood of employment termination. The analytics server then verifies whether the prediction is correct (e.g., because the results are known, the analytics server can determine whether the employee was indeed terminated).

Using the above-described method, the analytics server may evaluate whether the AI model is properly trained. The analytics server may continuously train and improve the model using this method. The analytics server may then gauge the AI model's accuracy (e.g., area under the curve, precision, and recall) using the remaining data points within the training dataset (e.g., second fold or second category). For instance, the analytics server may train the AI model using 75% of the ground truth data. The analytics server may then use the remaining 25% of ground truth data to gauge the accuracy of the trained AI model. The analytics server may continuously and iteratively train the AI model unless and until the AI model's accuracy satisfies a pre-determined threshold.

As a part of the AI model training, the analytics server may execute the AI model to generate and display a score for one or more employees indicative of a likelihood of the employee being terminated. The analytics server may use the displayed results to further train and revise the AI model. The analytics server may retrain the AI model based on responses received from the end-users viewing the results. For instance, the end-user may submit an input identifying that a predicted result is incorrect. The analytics server may use this information to revise and retrain the AI model. The analytics server may repeat retraining unless and until the AI model has reached an accuracy level that satisfies a pre-determined threshold. In an example, the analytics server may display a score associated with an employee that indicates a high likelihood of the employee being terminated within the next month. A system administrator may view the score and indicate that the score is incorrect (e.g., after a month, the employee is not terminated). The analytics server may use this input to re-calibrate the AI model.

As described above, the analytics server may continuously and iteratively train the AI model based on end-user interactions and feedback. The analytics server may monitor various end-users' interactions with the identified data to improve the results by revising and retraining the AI model. The analytics server may monitor the electronic device viewing results to identify their interactions. Based on the end-users interactions (e.g., approval, denial, and/or modification of the results), the analytics server may then revise and retrain the AI model.

The analytics server may utilize an API to monitor the end-user's activities. The analytics server may use an executable file to monitor the end-user's electronic device. The analytics server may also monitor the GUIs displayed via a browser extension executing on the electronic device. The analytics server may monitor multiple electronic devices and various applications executing on the electronic devices. The analytics server may communicate with various electronic devices and monitor the communications between the electronic devices and the various servers executing applications on the electronic devices.

In some embodiments, the analytics server may monitor the data packages received and sent by each electronic device to monitor the content of what is displayed, executed, or modified on the electronic device. The communication may take any suitable form. For example, the electronic device may execute an application (e.g., browser extension) having an executable file that enables an end-user to navigate to the GUIs described herein (e.g., web site).

The analytics server may use several techniques to track end-users' activities on the electronic device, such as by tracking browser cookies and/or screen-scraping protocols. In another example, the analytics server may track the end-user activity by periodically retrieving end-users' web browser cookies. The analytics server may transmit cookies to a system database where they can be analyzed (e.g., in batches) to identify end-user activities and interactions.

At step 830, the analytics server may execute the trained AI model using data associated with a new user to generate a notification. The analytics server may execute the trained AI model to predict a termination likelihood for a participant. The analytics server may then display the score on one or more electronic devices. The analytics server may execute the trained AI model at any time. For instance, the analytics server may execute the AI model when generating the secure loan dataset. In that example, when an employee or plan sponsor requests that the analytics server secure a loan, the analytics server may retrieve plan sponsor data and employee data to generate a score for the employee. The analytics server may then generate a feature vector corresponding to the employee (participant) data and/or plan sponsor data.

Using the feature vector, the analytics server may execute the trained AI model to generate a score. As described herein, the score is indicative of a likelihood of the participant being terminated within a defined period of time. For instance, the score may indicate that there is a high likelihood that the participant is terminated within the next six months. As a result, the analytics server may generate a premium for the plan sponsor and/or the participant accordingly. For instance, a premium for a participant who is at a higher chance of termination may be increased.

In another example, the analytics server may generate a premium based on plan sponsor information. For instance, the server may generate a score for multiple employees signing up for the services provided by the analytics server (e.g., generating a secure loan dataset). The analytics server may execute the AI model for all the employees (participants) and the plan sponsor. As a result, the analytics server may generate a score indicative of a likelihood of the employees being terminated. Using the score, the analytics server may generate a premium for the plan sponsor (and not based on individual employee data). For instance, when the AI model predicts a high likelihood of default for a participant and/or a high likelihood of for the employer, the analytics server may calculate a higher premium to secure the participant's loan.

Additionally or alternatively, results predicted by the trained AI model may be transmitted to a second server. For instance, the analytics server may transmit the score to a third-party (e.g., external) server, such that the third-party server can ingest the score and generate a premium for the participant and/or the plan sponsor.

At step 840, the analytics server may generate a notification that includes a likelihood of the triggering employment status attribute for the second user (a new user). The analytics server may revise a graphical user interface to display the results predicted by the AI model. For instance, the analytics server may display the likelihood of the user being terminated (e.g., laid off) within the duration of the loan and/or the employer having a series of layoffs. A non-limiting example of the notification generated by the analytics server is provided in FIG. 13.

Additionally or alternatively, the analytics server may execute the AI model using data associated with the new user's employer (e.g., plan sponsor). For instance, when a user requests to secure a loan, the analytics server may web-crawl one or more electronic data sources (e.g., news websites) to retrieve data associated with an employer of the user. The data may include any electronic document available (e.g., news stories, blogs, social media posts, financial filings (e.g., SEC filings), and other corporate information and filings). The analytics server may then execute the AI model to generate and display a likelihood of the employer having layoffs or having other financial difficulties, such as insolvency and/or bankruptcy (e.g., as depicted in FIG. 13). The predicted results can also be used to generate a premium for the user's loan.

Figure 9:
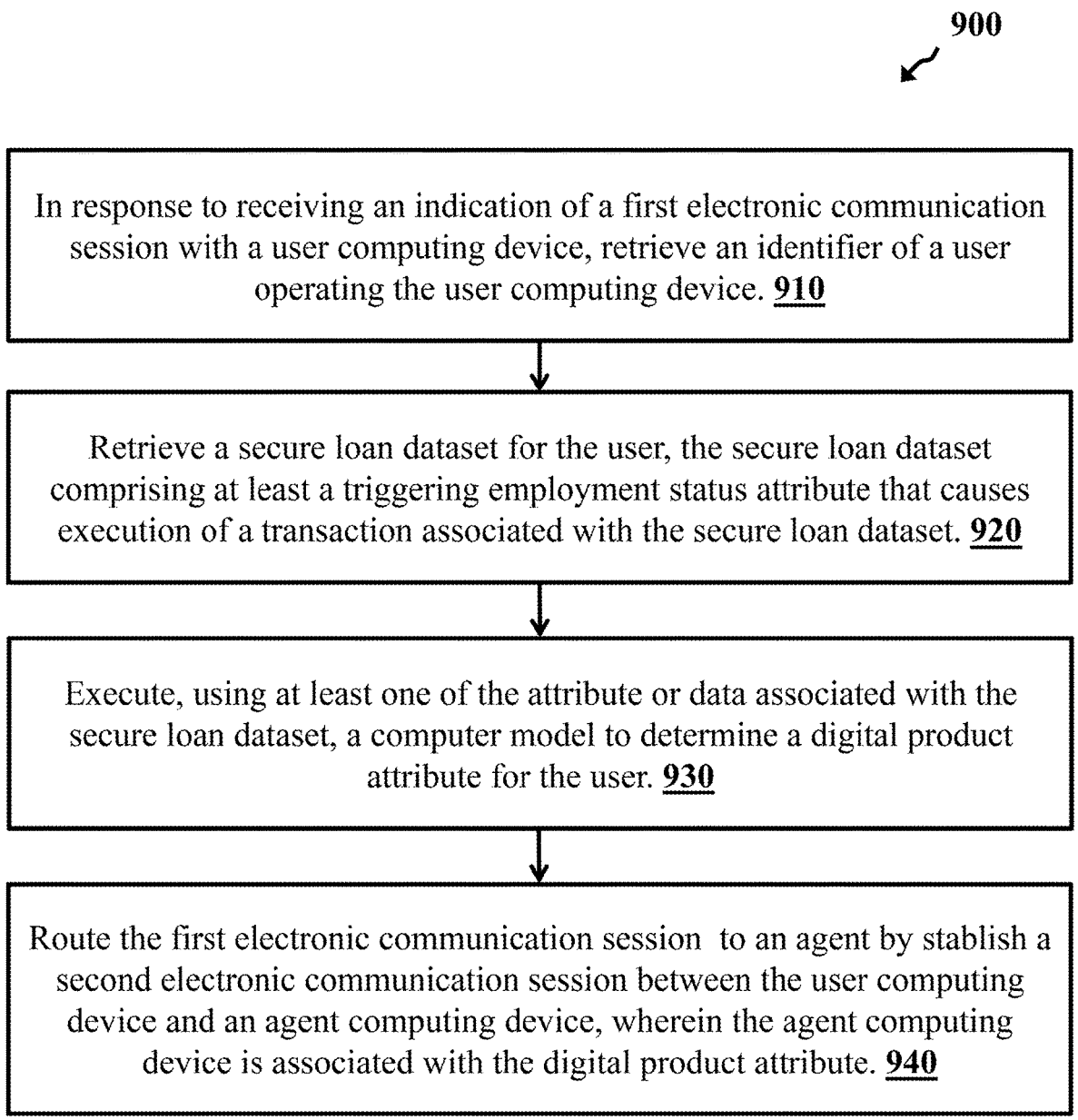

Referring now to FIG. 9, a flowchart depicting operational steps of a method for predicting a score for a participant is provided. Steps of the method 900 may be implemented using the analytics server, the recordkeeping computing system, the employer computing system, the insurance server, and/or the user computing device. FIG. 9 does not imply any limitations with regard to the environments or embodiments that may be implemented. Modifications to the depicted environment or the embodiment shown in FIG. 9 may be made. While certain aspects may be illustrated herein with reference to a retirement account, it is expressly understood that these embodiments can be configured to apply to a variety of other financial services and investments.

At step 910, in response to receiving an indication of a first electronic communication session with a user computing device, the analytics server may retrieve an identifier for a user operating the user computing device. The analytics server may be a server in communication with various electronic devices operated by employees of a call center (also referred to herein as customer services representative or CSR) where each CSR is connected to a customer who has called the call center (e.g., electronic communication session). Even though aspects of the embodiment discussed herein are directed towards telephonic communication sessions, the methods discussed herein apply to all communication sessions (e.g., video calls, virtual meetings, and chat sessions).

The analytics server may receive an indication that a user computing device has established a first electronic communication session with the analytics server or another server of the call center. In embodiments where the electronic communication session corresponds to a telephonic communication session, the analytics server may receive a notification that a customer has called the call center. In other embodiments, the analytics server may receive an indication that the user has initiated a chat session or a video call. For instance, a participant may initiate a chat session using a hyperlink to a website associated with the analytics server (or an organization that is in communication with the analytics server).

The analytics server may retrieve/receive an identifier associated with the participant and/or the participant's electronic device. The analytics server may query and retrieve the electronic device's IP address, MAC address, or any other unique identifier. In embodiments where the participant has called the call center, the analytics server may retrieve the caller's phone number. In addition to the above-described identifiers, the analytics server may also collect data associated with the participant. For instance, the analytics server may utilize an interactive voice response (IVR) where callers are prompted to enter personal information (e.g., account number or other identifying information). In another example, participants initiating chat sessions may be prompted via questions and input elements to provide identifying or personal information.

At step 920, the analytics server may retrieve a secure loan dataset for the user, the secure loan dataset comprising at least a triggering employment status attribute that causes execution of a transaction associated with the secure loan dataset. Using the identifier retrieved in step 910, the analytics server may retrieve data associated with a secure loan dataset for the participants. For instance, the analytics server may execute a look-up table whereby the analytics server identifies the services provided to the participant. The analytics server may determine when the secure loan dataset was generated. The analytics server may also retrieve details of the secure loan dataset (e.g., coverage amount, premium, plan sponsor, and amount borrowed). The analytics server may also retrieve financial data associated with the plan sponsor (e.g., earnings, number of employees, and assets).

At step 930, the analytics server may execute, using at least one of the attributes or data associated with the secure loan dataset, a computer model to determine a digital product attribute for the user. The analytics server may use one or more attributes associated with the participant and/or the participant's account to identify a new digital product to be presented to the participant. For instance, the analytics server may execute a computer model that uses an algorithmic approach to analyze data associated with the participant and the participant's existing services (e.g., secure loan dataset) to identify a subsequent digital product suitable to be purchased (or otherwise enrolled).

In some configurations, the computer model may be an AI model. The analytics server may use a dataflow in a predictive model pipeline to generate and train the computer model. The analytics server may collect data associated with previous participants (or other participant data retrieved and curated/processed from other entities and organizations) to generate a model that can predict a suitable digital product to be purchased (or enrolled in) by a participant.

The participant data may include, among others, digital product data, purchase history information data, and participant profile information. Non-limiting examples of digital product data may include: specific product type; information on plan sponsors; financial data; premiums; benefits; and risk class data, such as risk of default and occupation data for participants. Purchase history information may include information on a participant's first purchase (e.g., current services enrolled and date of first purchase), and information on new and cumulative purchases during each customer-year following the date of first purchase. Non-limiting examples of participant profile information may include age, gender, and/or other demographic information about the participant.

The trained model may also analyze whether the participant is ready for a subsequent purchase (e.g., whether a participant is ready to enroll in another service provided by the analytics server or an entity utilizing the analytics server). An aspect of predicting readiness to purchase or enroll in a subsequent digital product is the timing of purchases. The analytics server may also analyze purchase history information for the population of participants to be modeled. In an embodiment, the analytics server may track purchases of each participant, starting from their first purchase and including all new and cumulative purchases. Using this data, the analytics server may train the AI model, such that the AI model can predict a readiness for a new participant.

The analytics server may train the computer model using the above-described data, among others, such that the computer can predict a suitable subsequent digital product to be purchased by the participant within a threshold. Specifically, the AI model may predict attributes of a subsequent digital product to be purchased or enrolled in by the participant.

At step 940, a second electronic communication session may be established between the user computing device and an agent computing device, wherein the agent computing device is associated with the digital product attribute.

Upon identifying the digital product attribute, the analytics server may execute a look-up table and identify one or more corresponding products, such as additional insurance coverage, life insurance, and the like. The analytics server may then establish a second communication session between the user computing device (participant) and an agent computing device. The analytics server may execute a look-up table to identify all products that correspond to the attribute predicted/calculated by the computer model. The analytics server may then execute another look-up table and identify one or more agents who are skilled and specialized in discussing the identified products.

The analytics server may establish a second electronic communication session with between the participant and the identified agents. The analytics server may use various methods discussed herein to establish the second electronic communication session. For instance, the analytics server may establish a video conference with the agent or may route the participant's call to the agent. In some configurations, the analytics server may add the participant to a queue of participants wherein the queue is designated for participants who are interested (or identified as potentially interested) in a particular digital product.

The analytics server may also display data associated with the participant on the agent's computing device. For instance, when the second electronic communication session is established, the analytics server may transmit a prompt to the agent's computing device that includes the participant's demographic data, information associated with the secure loan dataset (e.g., amount of loan, insurance premium, plan sponsor information, and default status), and information associated with the digital product (e.g., name of the product, premium associated with the product, and other relevant information).

In some embodiments, the analytics server may display the identified digital product attribute on the agent's computing device. For instance, when the analytics server identifies a first electronic communication session established with a user who called a call center, the analytics server may route the call to an agent to establish a second electronic communication session. In some instances, the analytics server may route the call to an agent based on particular qualifications or capabilities of that agent. During the second electronic communication session, the analytics server may populate a graphical user interface of the agent computing device with data associated with the digital product (e.g., next product to be purchased by the user). For instance, the graphical user interface may display the user's existing loans and purchases produced (e.g., type of secure loan, amount, insurance premium, employer name and data, and/or data of loan origination and termination). The analytics server may also display an indication of a next product to be purchased by the user (e.g., disability insurance). The analytics server may also display demographic data, such as age, location, income, education level, and the like.

The various illustrative logical blocks, modules, circuits, and algorithm steps described in connection with the embodiments disclosed herein may be implemented as electronic hardware, computer software, or a combination of both. To clearly illustrate this interchangeability of hardware and software, various illustrative components, blocks, modules, circuits, and steps have generally been described above in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods have been described without reference to the specific software code, it being understood that software and control hardware can be designed to implement the systems and methods based on the description herein.

When implemented in software, the functions may be stored as one or more instructions or code on a non-transitory, computer- or processor-readable storage medium. The steps of a method or algorithm disclosed herein may be embodied in a processor-executable software module, which may reside on a computer- or processor-readable storage medium. A non-transitory, computer- or processor-readable medium includes both computer storage media and tangible storage media that facilitate transfer of a computer program from one place to another. A non-transitory, processor-readable storage medium may be any available media that may be accessed by a computer. By way of example, and not limitation, such non-transitory, processor-readable media may comprise RAM, ROM, EEPROM, CD-ROM, or other optical disk storage; magnetic disk storage or other magnetic storage devices; or any other tangible storage medium that may be used to store program code in the form of instructions or data structures and that may be accessed by a computer or processor. "Disk" and "disc", as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory, processor- and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   generating, by a server, a training dataset comprising data corresponding to a set of participants associated with a set of secure loan datasets, a set of employment data, and a set of employment scenarios;
   training, by the server, a machine learning model using the training dataset, such that the machine learning model is configured to predict a likelihood of at least one triggering employment status in accordance with a predicted employment scenario within the set of employment scenarios;
   displaying, by server, an input element on a graphical user interface configured to instruct the server to generate a secure loan dataset having a triggering employment status attribute that causes the server to execute a transaction associated with the secure loan dataset;
   receiving, by the server, a negative selection associated with the input element;
   executing, by the server, the machine learning model using at least one attribute of a user interacting with the input element to predict a likelihood of at least one triggering employment status for the user and at least one scenario in which the triggering employment status is modified; and
   dynamically revising, by the server, the graphical user interface to display data associated with the at least one scenario simulating at least one modification of the triggering employment status.

2. The method of claim 1, wherein the graphical user interface displays at least one of a pie chart or a bar chart.

3. The method of claim 1, wherein the graphical user interface displays a likelihood of a default of the secure loan dataset.

4. The method of claim 3, wherein the graphical user interface displays at least a fee associated with the default.

5. The method of claim 1, further comprising:
   displaying, by the server, the graphical user interface on a computing device of an administrator.

6. The method of claim 1, wherein the secure loan dataset corresponds to a loan in which its premiums are either paid by the user or an insurance server.

7. The method of claim 1, further comprising:
   displaying, by the server, a second input element configured to receive a positive response associated with the input element.

8. The method of claim 1, wherein the secure loan dataset corresponds to a loan account that is originated from an investment account.

9. The method of claim 8, wherein the investment account is a 401 (k) plan or an individual retirement plan.

10. The method of claim 1, wherein the triggering employment status corresponds to new employment.

11. A system comprising:
    a non-transitory machine-readable memory configured to store a set of instructions that when executed, cause a processor to:
    generate a training dataset comprising data corresponding to a set of participants associated with a set of secure loan datasets, a set of employment data, and a set of employment scenarios;
    train a machine learning model using the training dataset, such that the machine learning model is configured to predict a likelihood of at least one triggering employment status in accordance with a predicted employment scenario within the set of employment scenarios;
    display an input element on a graphical user interface configured to instruct the processor to generate a secure loan dataset having a triggering employment status attribute that causes the processor to execute a transaction associated with the secure loan dataset;
    receive a negative selection associated with the input element;
    execute the machine learning model using at least one attribute of a user interacting with the input element to predict a likelihood of at least one triggering employment status for the user and at least one scenario in which the triggering employment status is modified; and
    dynamically revise the graphical user interface to display data associated with the at least one scenario simulating at least one modification of the triggering employment status.

12. The system of claim 11, wherein the graphical user interface displays at least one of a pie chart or a bar chart.

13. The system of claim 11, wherein the graphical user interface displays a likelihood of a default of the secure loan dataset.

14. The system of claim 13, wherein the graphical user interface displays at least a fee associated with the default.

15. The system of claim 11, wherein the set of instructions further cause the processor to:
    display the graphical user interface on a computing device of an administrator.

16. The system of claim 11, wherein the secure loan dataset corresponds to a loan in which its premiums are either paid by the user or an insurance server.

17. The system of claim 11, wherein the set of instructions further cause the processor to:
    display a second input element configured to receive a positive response associated with the input element.

18. The system of claim 11, wherein the secure loan dataset corresponds to a loan account that is originated from an investment account.

19. The system of claim 18, wherein the investment account is a 401 (k) plan or an individual retirement plan.

20. The system of claim 11, wherein the triggering employment status corresponds to new employment.

* * * * *